(12) United States Patent
Dawid et al.

(10) Patent No.: US 10,462,743 B2
(45) Date of Patent: Oct. 29, 2019

(54) MOBILE COMMUNICATIONS DEVICE AND A METHOD FOR CONTROLLING A MOBILE COMMUNICATIONS DEVICE RECEIVER

(71) Applicants: Intel IP Corporation, Santa Clara, CA (US); Herbert Dawid, Herzogenrath (DE); Armin Haeutle, Dachau (DE); Edgar Bolinth, Korschenbroich (DE); Markus Jordan, Gelsenkirchen (DE); Thomas Esch, Kaarst (DE)

(72) Inventors: Herbert Dawid, Herzogenrath (DE); Armin Haeutle, Dachau (DE); Edgar Bolinth, Korschenbroich (DE); Markus Jordan, Gelsenkirchen (DE); Thomas Esch, Kaarst (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/738,605

(22) PCT Filed: Jun. 25, 2015

(86) PCT No.: PCT/EP2015/064454
§ 371 (c)(1),
(2) Date: Dec. 21, 2017

(87) PCT Pub. No.: WO2016/206747
PCT Pub. Date: Dec. 29, 2016

(65) Prior Publication Data
US 2018/0167884 A1 Jun. 14, 2018

(51) Int. Cl.
*H04W 52/28* (2009.01)
*H04W 52/02* (2009.01)
(Continued)

(52) U.S. Cl.
CPC ....... *H04W 52/0229* (2013.01); *H04L 1/0002* (2013.01); *H04L 1/003* (2013.01);
(Continued)

(58) Field of Classification Search
None
See application file for complete search history.

(56) References Cited

U.S. PATENT DOCUMENTS

| 2014/0126443 A1* | 5/2014 | Chizgi | H04W 52/02 370/311 |
| 2015/0351028 A1* | 12/2015 | Vallath | H04W 52/0209 370/311 |
| 2017/0196008 A1* | 7/2017 | Wang | H04W 76/28 |

OTHER PUBLICATIONS

International Search Report based on application No. PCT/EP2015/064454 (14 pages) dated May 12, 2016.
(Continued)

*Primary Examiner* — Faruk Hamza
*Assistant Examiner* — Thinh D Tran
(74) *Attorney, Agent, or Firm* — Viering, Jentschura & Partner MBB

(57) ABSTRACT

A method of controlling a mobile communications device receiver, which includes: activating the receiver, receiving a voice signal divided into a plurality of voice time intervals, detecting a silent voice time interval from content of the received voice signal, and deactivating the receiver during at least a portion of the silent voice time interval. In addition, the method may also include: receiving a signaling signal divided into a plurality of signaling time intervals, detecting an empty signaling time interval from the plurality of signaling time intervals, and deactivating the receiver during at least a portion of the empty signaling time interval.

20 Claims, 15 Drawing Sheets

(51) Int. Cl.
*H04W 76/28* (2018.01)
*H04L 1/00* (2006.01)
H04L 29/06 (2006.01)

(52) U.S. Cl.
CPC .......... *H04L 1/0078* (2013.01); *H04W 76/28* (2018.02); H04L 65/80 (2013.01); Y02D 70/00 (2018.01); Y02D 70/1242 (2018.01); Y02D 70/25 (2018.01)

(56) References Cited

OTHER PUBLICATIONS

"Specification #: 25.212", http://www.3gpp.org/DynaReport/25211.htm, retrieved Dec. 21, 2017.
"Speech codec speech processing functions; Adaptive Multi-Rate—Wideband (AMR-WB) speech codec; Source controlled rate operation" Sep. 2014, version 12.0.0, Section 5.1.2, p. 8-9., 3rd Generation Partnership Project; Technical Specification Group Radio Access Network.
"Mandatory speech codec speech processing functions; Adaptive Multi-Rate (AMR) speech codec; Source controlled rate operation", Sep. 2014, version 12.0.0, Section 5.1.2, p. 9-10., rd Generation Partnership Project;Technical Specification Group Radio Access Network.
"Physical channels and mapping of transport channels onto physical channels (FDD)", Dec. 2014, version 12.1.0, 3rd Generation Partnership Project;Technical Specification Group Radio Access Network.
"Multiplexing and channel coding (FDD)", Dec. 2014, version 12.1.0, 3rd Generation Partnership Project; Technical Specification Group Radio Access Network.
"Draft ETSI EN 301 707, version 7.4.0", Jul. 2000.

* cited by examiner

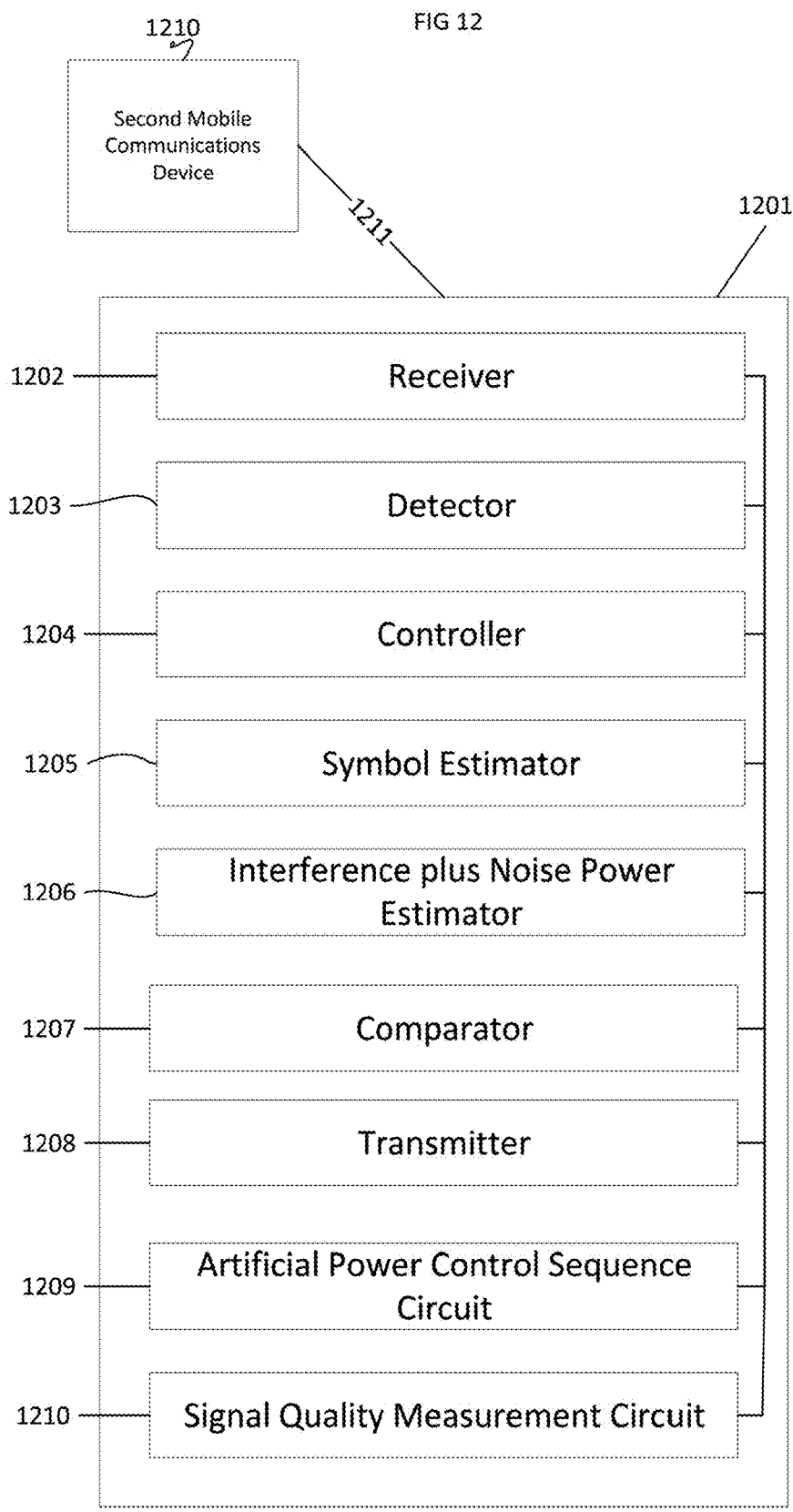

MOBILE COMMUNICATIONS DEVICE AND A METHOD FOR CONTROLLING A MOBILE COMMUNICATIONS DEVICE RECEIVER

RELATED APPLICATIONS

The present application is a national stage entry according to 35 U.S.C. § 371 of PCT application No.: PCT/EP2015/064454 filed on Jun. 25, 2015, which is incorporated herein by reference in its entirety.

TECHNICAL FIELD

Various embodiments relate generally to mobile communications devices and methods for controlling a mobile communications device receiver.

BACKGROUND

Mobile communication devices are developing at a rapid pace. Software and hardware performance demands outpace battery technology development. Mobile communication device power consumption and battery life have become important technological considerations.

Battery power consumption is relatively high during circuit switched voice calls, e.g., under the Third Generation Universal Mobile Telecommunications System (3G UMTS), as data is continuously transmitted and received. On average, however, nearly half of the time or even more of a voice call may consist of speech pauses when viewed from one side of a conversation. Significant power savings can be achieved by turning off the receiver of the User Equipment (UE), as well as other related circuitry, for example baseband receive circuitry, during the speech pauses. Turning the receiver of the UE off, however, presents a number of issues. For example, a UE user does not want to miss when the other person begins speaking again, miss data related to comfort noise generation, or miss important configuration information for proper UE function. It would be advantageous to have a solution that combines decreases in power consumption during voice calls while avoiding loss of certain types of information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 12 shows various components and circuits of a mobile communications device according to aspects of the disclosure.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

It is to be noted the ensuing description discusses utilization of the mobile communication device under 3GPP (Third Generation Partnership Project) specifications, notably 3G UMTS (Universal Mobile Telecommunications System). Other mobile radio communication systems, however, may also be used, where applicable. The examples provided herein can apply to other existing or other not yet formulated standards, so long as they share the underlying features disclosed in the following examples.

Figure 1A:
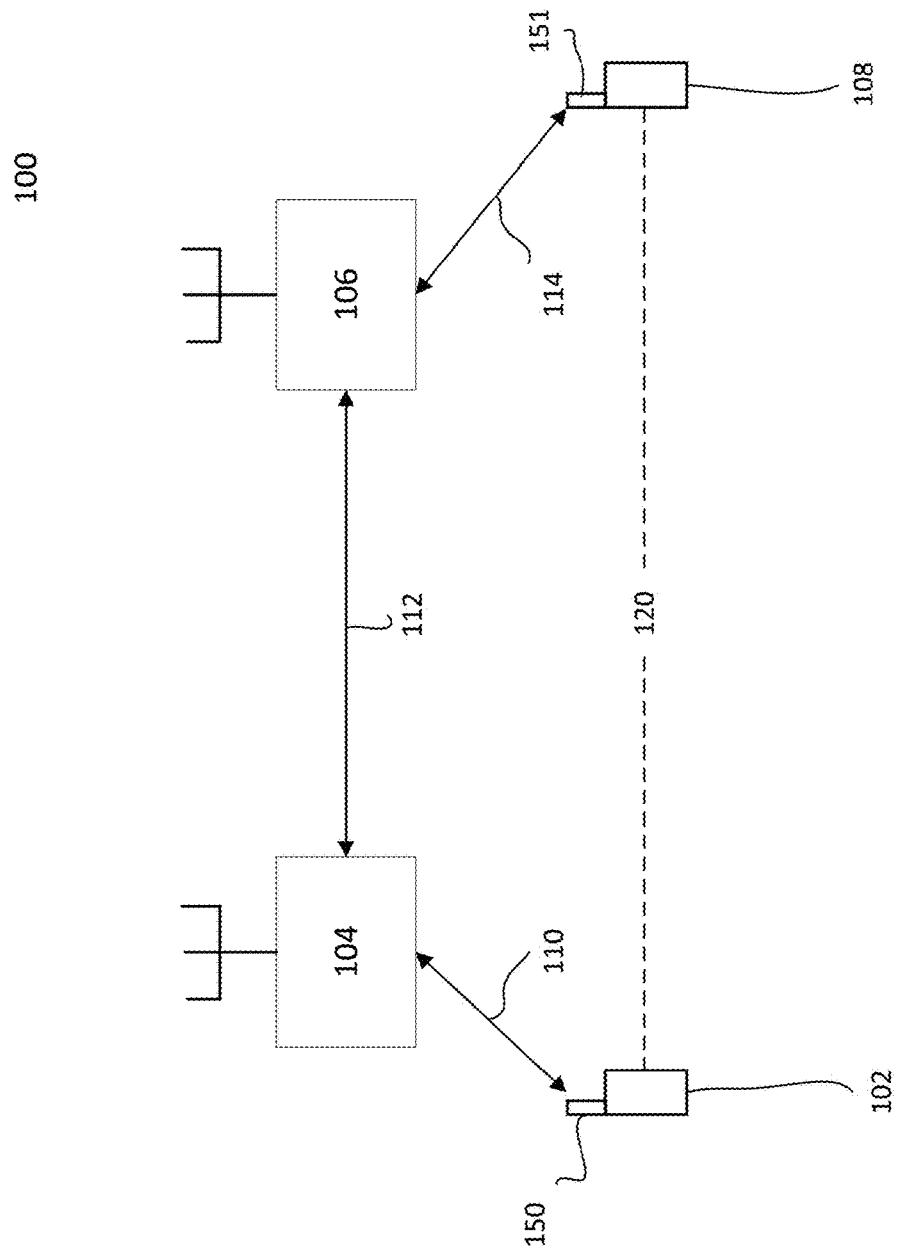
FIG. 1A is a block diagram illustrating a mobile radio communication system.

FIG. 1A shows a mobile radio communication system 100. A mobile communications device 102, or User Equipment (UE) 102, which may have a receiver 150, may be engaged in a voice call with UE 108, which may have a receiver 151. Voice data 120 may be communicated via air interface 110 to a base station 104. Base station 104 may for example be a NodeB or an eNodeB. The voice call content 120 may then be further communicated via interface 112 to base station 106, where the voice data 120 may be communicated to UE 108 via air interface 114. Voice call content may also be communicated in the opposite direction from UE 108 to UE 102 via the base station 106, interface 112, and base station 104. The mobile radio communication system 100 may for example represent a 3G UMTS circuit switched voice call.

During a 3G UMTS circuit switched voice call, the audio input, e.g., a person's speech or background noises, in a mobile communications device is received by another mobile communications device in a compressed or encoded form using speech coders and decoders (or codecs), e.g., adaptive multi-rate speech coding (AMR) or the Enhanced Voice Services (EVS) codec. When there is a pause in the speech, the mobile communications device receives a predetermined arrangement of frames that corresponds to the pause in speech, or silence, until speech resumes. The speech pause may be detected by a speech coder which then generates the predetermined arrangement of frames. This arrangement applies to EVS, narrowband AMR (NB-AMR), and wideband AMR (WB-AMR) (see 3GPP Technical Specification (TS) 26.449; 3GPP TS 26.450; 3GPP TS 26.093, Section 5.1.2; 3GPP TS 26.193, Section 5.1.2). For example, the disclosure discusses AMR speech coding.

Figure 1B:
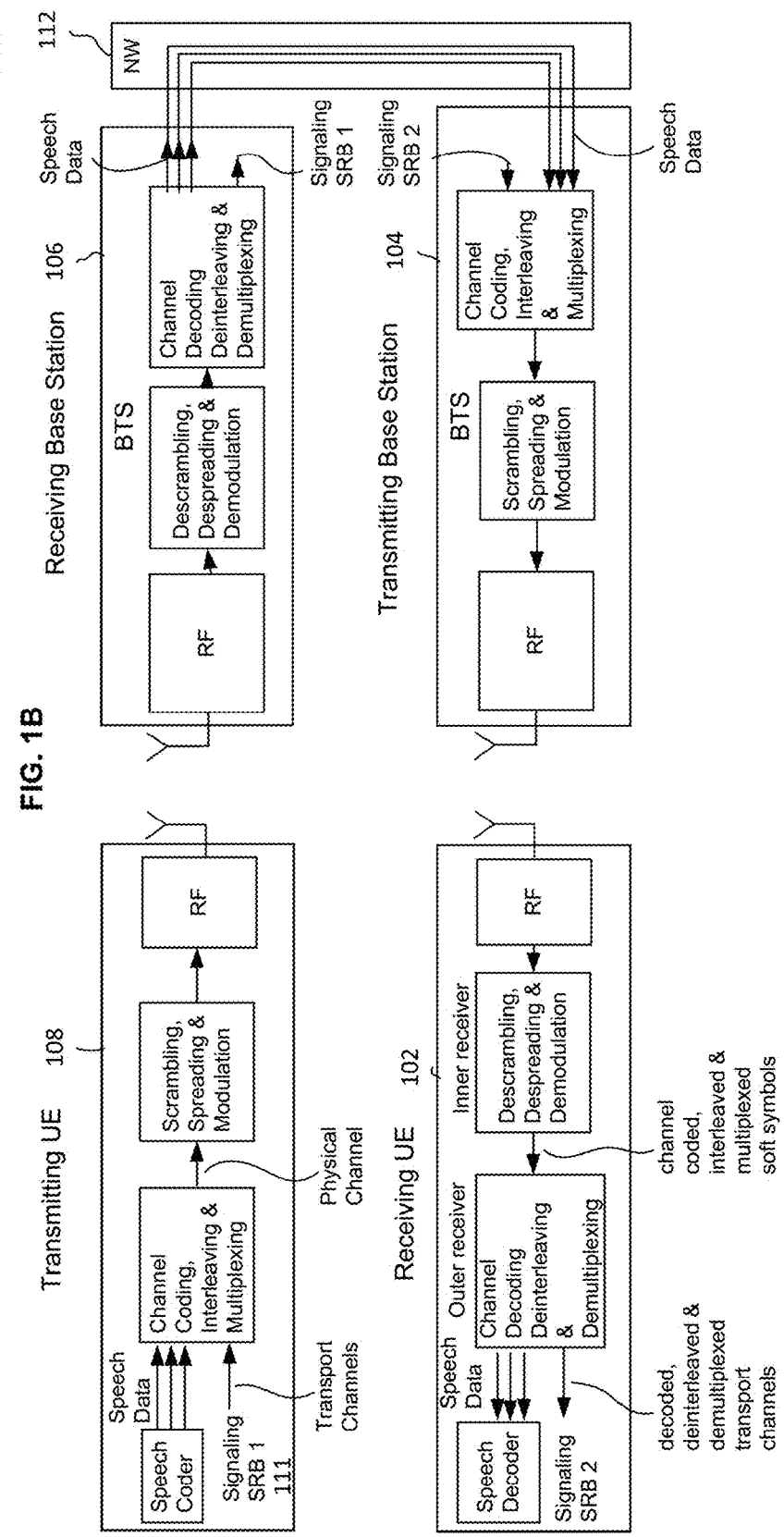
FIG. 1B is a block diagram illustrating the transfer of speech data via a mobile radio communication system.
Figure 1C:
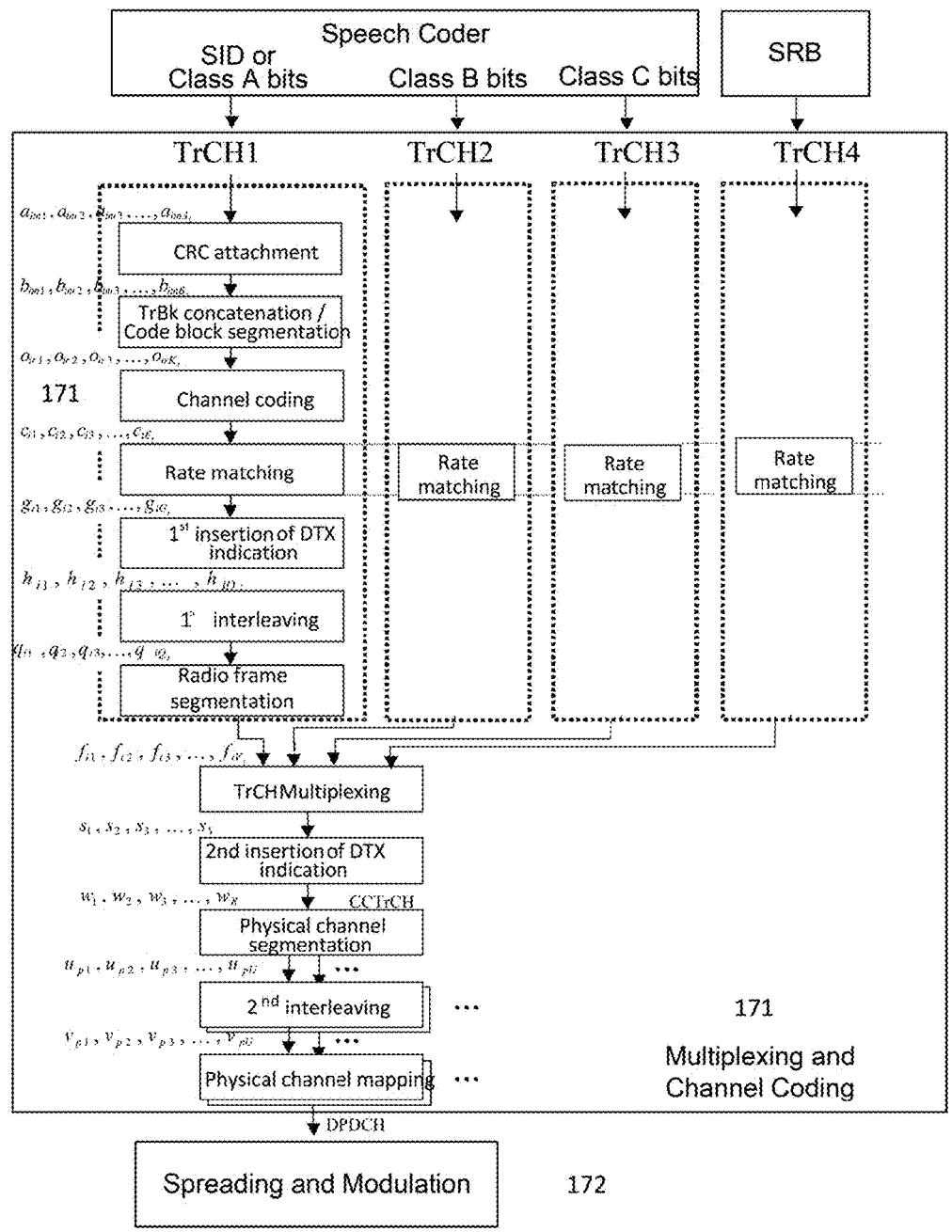
FIG. 1C is a flow chart according to an aspect of the disclosure.

FIG. 1B shows the transfer of speech data 120 (considering only one of the two bi-directional transmissions from the transmitting UE 108 to the receiving UE 102) and the corresponding transmission chain for AMR speech coding. The AMR speech coder 170 on the transmit side may create speech data frames of 20 ms duration, containing Class A, B, and C bits, when the voice activity detector (VAD) in the speech coder 170 detects speech. If the VAD detects silence, then SID (silence descriptor) frames of 20 ms duration may be generated by the speech coder 170 every 160 ms. The speech frames may be mapped to transport channels for channel coding, interleaving, and multiplexing 171, as shown in FIG. 1C (which is based on "FIG. 2: Transport Channel Multiplexing Structure for Downlink" in 3GPP TS 25.212; see http://www.3gpp.org/DynaReport/25212.htm). In case of speech, three packets containing the Class A, B, and C data, may be mapped to three respective transport channels. In case of silence, the SID frames, e.g., SID First 231 and SID Update 233, may be mapped to the first of these three transport channels, and the other two transport channels are left empty. As shown in FIG. 1B, an additional signaling channel (e.g., a signaling radio bearer or SRB 111) may be added in the transmitting UE. This SRB 111 contains signaling information for uplink to the receiving base station 106. The channel coded, interleaved, and multiplexed speech data 120, may then be scrambled, spread and modulated, and transmitted, by uplink to the receiving base station. The receiving base station performs descrambling, despreading, demodulation and transport channel de-multiplexing, de-interleaving and decoding, and, finally, transmits the three speech transport channels to the transmitting base station on the receiving end via the backbone network. The transmitting base station may additionally add an SRB 111 to transmit signaling information from the network to the receiving UE, perform channel coding, interleaving and multiplexing, as well as, modulation, spreading and scrambling, and transmission of the data to the receiving UE 102. The receiving UE 102 may perform descrambling, despreading, demodulation and transport channel de-multiplexing, de-interleaving, and decoding, and, finally, feed the three speech channels into the speech decoder. The SRB 111 may then be evaluated by the protocol stack of the receiving UE 102.

Figure 2:
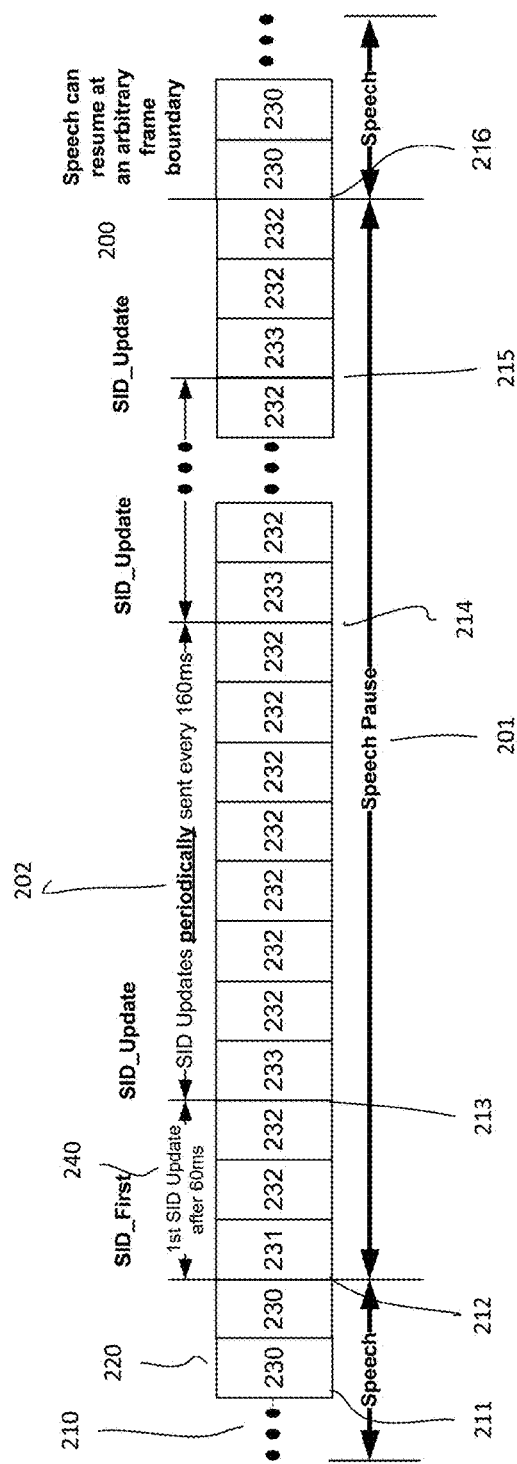
FIG. 2 is a timing diagram including a speech pause.

FIG. 2 illustrates a speech pause taking place during the transfer of data in a channel as implemented in the exemplary arrangement of FIG. 1A. A voice call between two UEs may occur at any arbitrary time 210, divided, for example, into frames 220 of 20 ms. Voice data 120 is received over an AMR speech channel 200 over time. More specifically, speech channel 200 illustrates data 120 as received in the form of AMR speech in the UE 102, transmitted from UE 108. Still more specifically, at time 211 two AMR speech frames 230 are consecutively transmitted, and at a time in the call corresponding to time 212, the speech on the call stops or there is silence in the received voice data due to an absence of sound detected, for example, by a microphone or speech coder in UE 108. Between time 211 and time 212 the voice data 120 is divided into two speech frames, such as speech frame 220 or transmission time interval (TTI) 220. Specifically, the two speech frames 220 between time 211 and time 212 may be referred to as AMR speech frames 230, or speech data.

At time 212, an AMR speech frame 230 has been received and a first silence descriptor (SID First) 231 may be transmitted to UE 102. Speech pause 201, or silence 201, during a voice call does not typically have a predetermined duration, and in such instance may end at any time. The content of voice data 120 may change at any time and be received by UE 102 thereafter, and the predetermined arrangement of speech frames 220 as shown in FIG. 2 may be considered dependent upon changing conditions, for example as measured in UE 108, and a period of silence such as speech pause 201 may be interrupted by the resumption of audible speech at any time. FIG. 2 is therefore merely illustrative of a possible arrangement of speech frames 220, before, during, and after a speech pause 201, under a mobile communications standard, e.g., 3GPP. The first predetermined arrangement of speech frames 220, or TTIs 220 (these terms may be used here interchangeably), is a three speech frame 220 block 240 between time 212 and time 213. Speech Frame SID First 231 may indicate to UE 102 that a speech pause 201 or silence 201 during the voice call has occurred or been detected. Where speech pause 201 has continued, SID First 231 may be followed by two discontinuous transmission (DTX) speech frames 232, i.e., block 240 signals the beginning of speech pause 201 and may include a predetermined arrangement of three speech frames 220 beginning with an SID First 231 followed by two DTX speech frames 232.

Before continuing with the description of the predetermined arrangement of speech frames 220, SID First 231, SID Update 233 (silence descriptor update), and DTX speech frames 232 will be described.

During a speech pause 201, or silence 201, it may be preferable to provide a background noise, static noise, or white noise, to the user of the UE 102. This may be referred to as comfort noise. Some users of UEs 102 may interpret a lack of any acoustic sounds as an indication the cellular connection has been lost or the call has failed. The comfort noise may indicate to the user of the UE 102, that although there are not any acoustic sounds actually being received by the UE 102, the UE 102 may, in fact, still be connected and receiving voice data 120, and the lack of acoustic sounds is intentional due to a received silence 201.

The sequence of SID First 231 and SID Update(s) 233 may convey information or instructions as to the generation of acoustic background noise during the speech pause 201, i.e., it may be utilized to provide realistic and dynamic comfort noise to the user of the UE 102, as well as indicate to UE 102 (e.g., via a speech decoder), that a speech pause 201 has begun.

During the speech pause 201 itself, the majority of speech frames 220 received are DTX speech frames 232. DTX speech frames 232 may contain "no speech data", i.e., no acoustic sounds, no acoustic speech from the user of another UE 108, or no data which may be useful for a conversation or voice call or telephonic communication that may be received by the UE 102. DTX speech frames 232 may, therefore, also be referred to as "empty".

The arrangement of speech frames 220 during a speech pause 201 follow a predetermined pattern and may be composed of the SID First 231 and SID Update(s) 233 with DTX speech frames 232 arranged in intervals therebetween. The pattern may continue after SID First 231 and two DTX speech frames 232 (i.e., block 240) followed by an SID Update 233, which may be followed by up to, for example, seven DTX speech frames 232. This set of one SID Update 233 followed by seven DTX speech frames 232 is an SID Update set 202 that may regularly repeat throughout the remainder of the duration of the speech pause 201.

During transmission, the SID Updates 233 may provide updated information for comfort noise generation throughout the remainder of the speech pause 201. This may describe the predetermined arrangement of speech frames 220 during a speech pause 201. Initially, the speech pause 201 begins at time 212. Thereafter and instantaneously, the UE 102 receives an SID First 231, which may always be followed by two DTX speech frames 232, so long as the speech pause 201 continues. Next, an SID Update set 202 is repeated for the remainder of the duration of the speech pause 201, i.e., an SID Update 233 may be received followed by seven DTX speech frames 232, in a repetitive and cyclic fashion until the speech pause 201 ends, and speech resumes, at some arbitrary time in the future, which is in this example, from time 213 to time 216. Time 214 and time 215 may illustrate the cyclic nature of the SID Update sets 202, which regularly repeat during the speech pause 201. Time 216 illustrates an arbitrary point in time where AMR Speech frames 230 resume, ending the cycle of SID Update sets 202.

The first SID Update 233 may occur after three speech frames 220 or TTIs 220. An individual TTI may be 20 ms, such as in the example of FIG. 2, or another period of time, such as 40 ms. The TTI 220 may be determined by the type of information communicated, for example AMR Speech or a signaling radio bearer (SRB). The TTI 220 may be similarly dictated by a communications standard such as 3GPP. In the exemplary FIG. 2, the TTI is 20 ms, thus first SID Update 233 may be received after 60 ms. SID Updates, such as SID Update 233 may then periodically be received every 160 ms as shown in FIG. 2.

Figure 3:
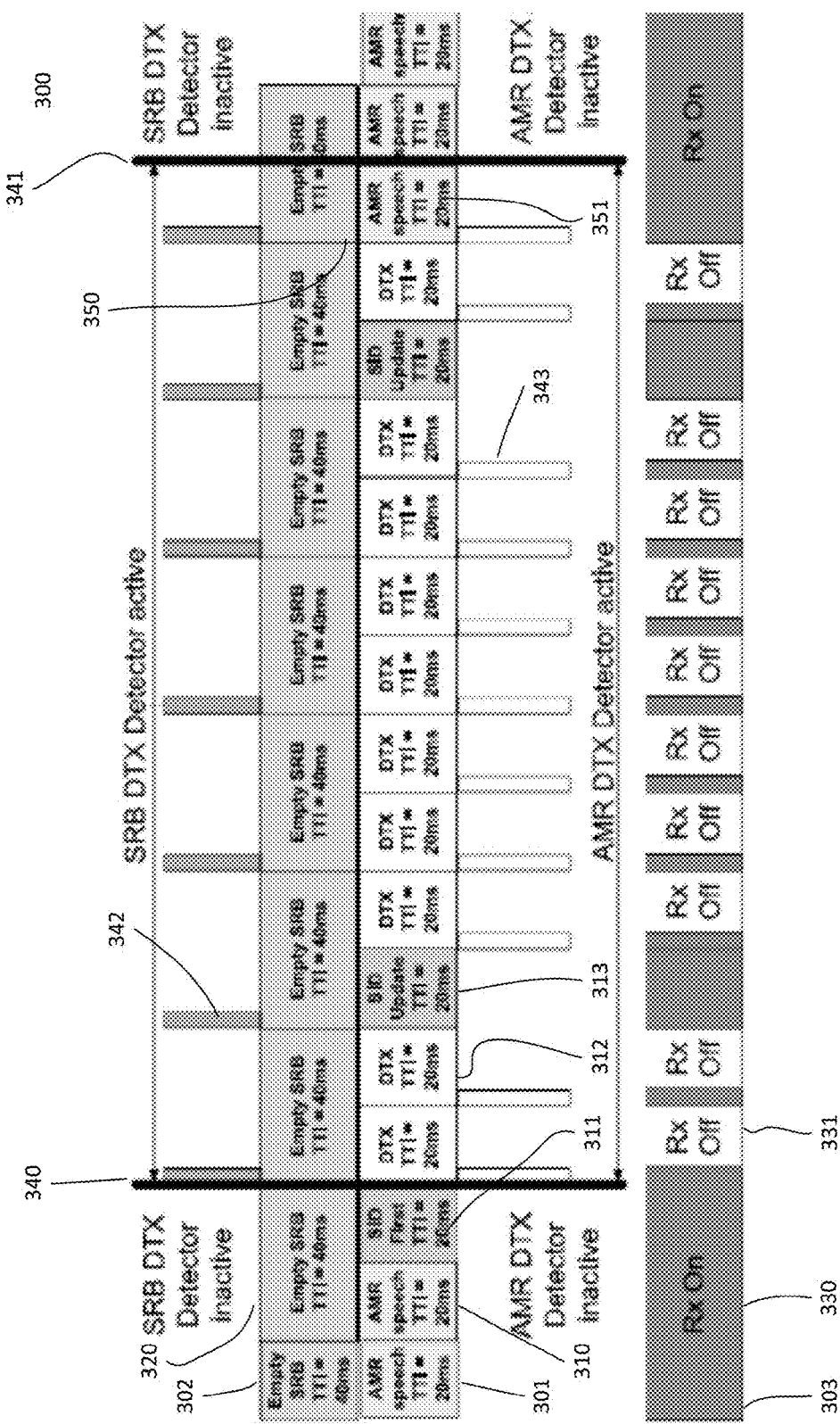
FIG. 3 is a timing diagram illustrating a detector according to an aspect of the disclosure.

FIG. 3 shows application 300 of a detector.

AMR Speech Channel 301 corresponds to the AMR Speech Channel 200 of FIG. 2, as well as a Speech Pause 201. AMR Speech frame 310 may be an exemplary speech frame corresponding to speech frames 220 of FIG. 2. Similarly, SID First 311, SID Update 313, and DTX speech frame 312 are exemplary and may correspond to their counterparts 231, 233, and 232, respectively, in FIG. 2.

During a voice call, UE 102 may receive a signaling message via a SRB channel 302 at any time. Such signaling messages may contain important mobile connection information and the reception of such information may be advantageous or mandatory, as they may be necessary to other functions of UE 102. The speech frames of the SRB Channel 302 are illustrated as Empty SRB frames 320. An Empty SRB Frame 320 may indicate a frame that does not contain any relevant signaling message, may be a frame of DTX, or where no signaling information may be received, but instead a cyclic redundancy check (CRC) code may be received in a periodic pattern, e.g., that may occur every 40 ms, in the Dedicated Physical Channel (DPCH).

Receiver 150 (Rx) Operation 303 is illustrated during the voice call over time. Sections 330, in grey or labeled as Rx On, indicate where the receiver 150 may be on, and sections 331, in white and labeled with Rx Off, indicate where the receiver 150 may be off.

As discussed above, it may be advantageous to turn off receiver 150 of a UE 102 during speech pauses 201 during a voice call. However, receiver 150 may be selectively activated to receive certain information during periods of time during which the information is expected. Likewise, receiver 150 may be activated for purposes of detecting the contents of frames such as an SRB frame 320 or a DTX frame 312. Application of a detector is shown between times 340 and 341. Bars 342 and 343 may represent, respectively, where the receiver may be on at the beginning of a frame 220 to detect the presence of speech or signaling information. The predetermined arrangement of speech frames 220 and the knowledge of empty SRBs 320 (or the periodic pattern of CRC in an SRB frame) may be exploited, in conjunction with a detector, to enable the potential reception of certain information, while saving power by turning off, or deactivating, the receiver 150 of the UE 102 during other periods in a speech pause. This advantage is illustrated in FIG. 3.

Upon reception of SID First 311, UE 102 receives an indication that a speech pause 201 has begun. The detector may then be activated and the receiver 150 may be turned off, however, the receiver 150 may be turned on at the beginning of each SRB TTI 320 and each DTX frame 312, respectively, for the detector to detect signaling information or speech. Additionally, as the SID Update set 202 is periodic and known, this information may be exploited to ensure the receiver 150 is on to receive the SID Updates 313 for comfort noise generation. The detector may determine at the beginning of each respective SRB TTI and each AMR TTI if speech or signaling information is present until the end of the speech pause 201. In FIG. 3, this may occur at time 350. Alternately, known frames in known positions, such as SID Updates 313 may be received without a need for detection. The detector may then be turned off once speech has been detected, e.g., at the end of AMR speech TTI 351, and the receiver 150 may remain on until the voice call is terminated or another speech pause 201 occurs.

Figure 4:
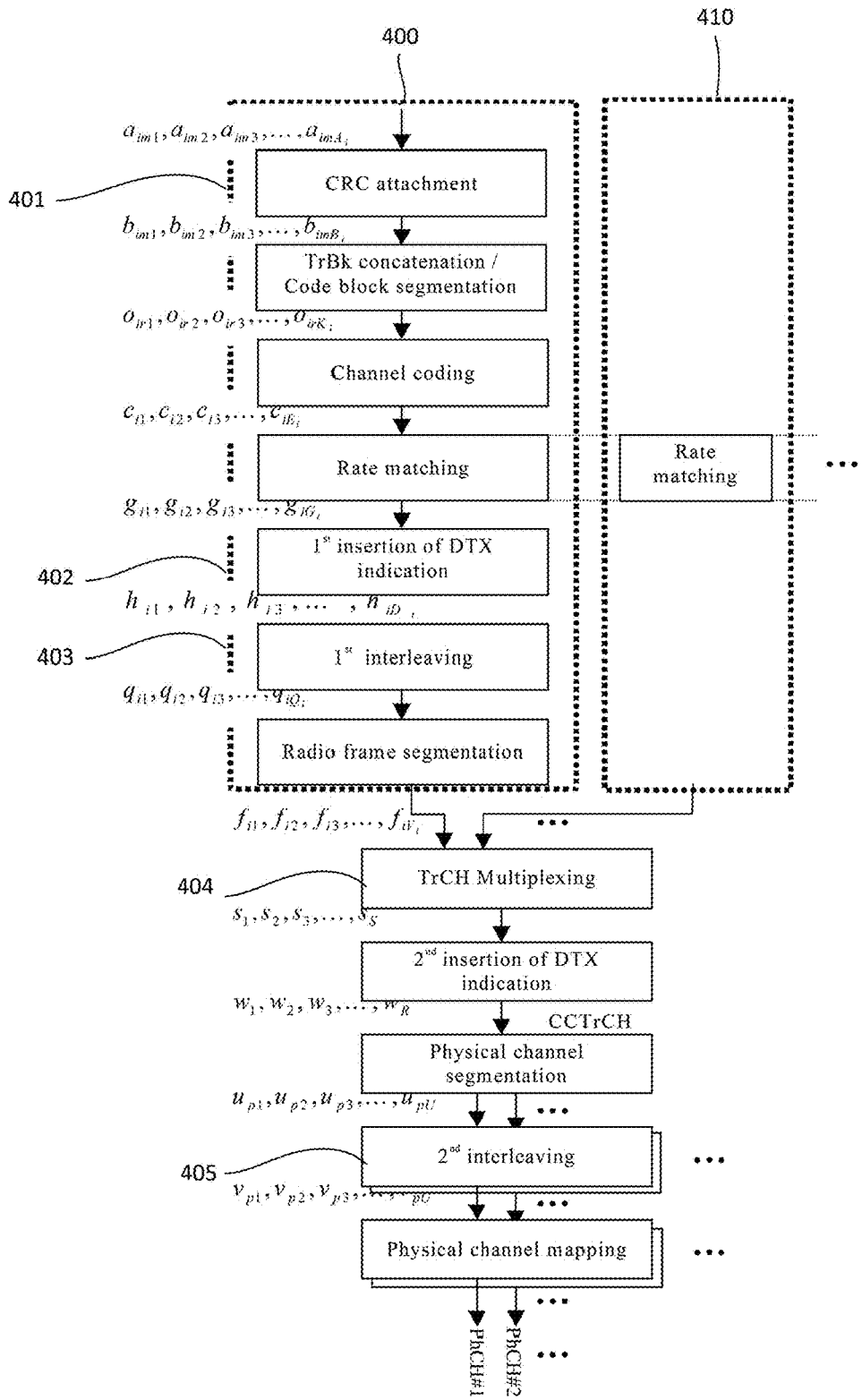
FIG. 4 is a flow chart according to an aspect of the disclosure.

FIG. 4 shows channel coding, rate matching, and interleaving as applied to the time charts of FIGS. 2 and 3. FIG. 4 is based on "FIG. 2: Transport Channel Multiplexing Structure for Downlink" in 3GPP TS 25.212 (see http://www.3gpp.org/DynaReport/25212.htm).

During a voice call, for example, according to 3G UMTS, the receiving UE 102 may not know the start and duration of an incoming speech pause. The UE 102 may, however, be able to detect speech pauses by investigating the amount and size of received transport blocks. Often, Blind Transport Format Detection (BTFD) may be utilized in conjunction with AMR speech coding. Where BTFD is utilized, the UE 102 may try to decode all possible allowed combinations of received transport channels. The UE 102 may then determine the actual transport channel combination sent once it has been successfully decoded, possibly using decoding quality metrics. Where BTFD is utilized, the UE 102 may only be able to detect a speech pause after the complete transport channel block(s) has been received and decoded. Then, however, it would be too late to save power by switching off the receive circuitry. The earliest point in the receive chain where the UE 102 may be able to distinguish the individually received transport channels is after a first interleaving and transport channel demultiplexing. At this point in time, however, already 10 ms of the possible 20 ms duration of a speech data block have already passed. Hence it may be very advantageous for the UE 102 to detect a speech pause as early as possible, e.g., simultaneously while receiving the first DPDCH symbols of the first 10 ms radio frame of the transport channel blocks. BTFD may utilize four, or more, transport channels. The AMR speech data may be contained in the first three transport channels (class 1, 2, and 3, speech bits) and the SRB may be contained on the fourth transport channel. The individual transport channels may be coded (step 401) and interleaved (step 403), and then the at least four or more transport channels may be multiplexed (step 404) into one physical dedicated channel, DPDCH (dedicated physical data channel).

The utilization of BTFD implies fixed positions according to the 3GPP standard, i.e., DTX bits are inserted into the respective coded transport channels before interleaving so that every transport channel occupies a fixed number of bits in the coded signal stream irrespective of the number of bits which are actually transmitted. The first indication of DTX insertion may occur at step 402 of FIG. 4. The first transport channel 400 (element 410 may represent any other transport channels) may carry the AMR voice data and by be protected by CRC in order to enable downlink power control (discussed later). The second and third transport channels (also represented by 410) for the AMR voice data may not be CRC protected. Additionally, the SRB may or may not be CRC protected, as dual transport format detection may be used for the SRB. Therefore, during a speech pause 201, the DTX speech frames 232 may only contain convolutionally coded CRC and DTX bits, and the second and third transport channels may contain only DTX bits. The convolutionally encoded CRC may be interleaved at step 403 over a predetermined time period, e.g., 20 ms or another transmission time interval, then multiplexed with the second and third transport channels which may only contain DTX bits, as well as the SRB, or fourth, transport channel. The multiplexed transport channels may then be framewise interleaved at step 405, which leads to a pattern of non-DTX bit positions in the DPDCH which may be periodic, e.g., every 20 ms.

Similarly, for the SRB, the TTI may be a predetermined period of time, e.g., 40 ms or another transmission time interval. If the SRB is CRC protected, this may lead to a pattern of non-DTX bit positions in the DPCH which may be periodic, e.g., every 40 ms. If the SRB is not CRC protected, the corresponding bit positions may all contain DTX bits. The fixed positions of the non-DTX coded CRC in the DPDCH resulting from the steps of FIG. 4 may then be exploited by the detector.

Figure 5:
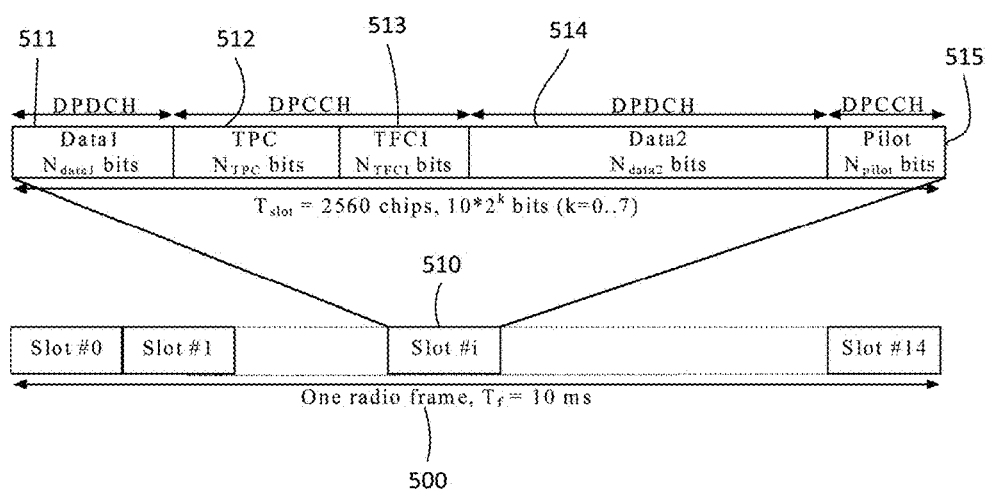
FIG. 5. is a diagram detailing frame and slot structure according to an aspect of the disclosure.

FIG. 5. shows frame and slot structure. FIG. 5 is based on "FIG. 9: Frame Structure for Downlink DPCH" in 3GPP TS 25.211 (see http://www.3gpp.org/DynaReport/25211.htm).

The detector may additionally exploit pilot and transmission power control (TPC) bits in the dedicated physical control channel (DPCCH). The position of these bits is discussed in FIG. 5 along with frame and slot structure. One frame 220 as shown in FIG. 2, may actually be composed of two radio frames 500, each of which may be a period of time, such as 10 ms. A single radio frame 500 may then be subdivided into fifteen slots, such as slot 510. A single slot 510 may be composed of a number of chips, e.g., 2,560 chips. Within the single slot 510, different types of information may be interleaved and multiplexed, as discussed in FIG. 4. For example, a single slot 510 may contain information from the DPDCH and DPCCH, respectively. The slot 510 may begin with data 511 from the DPDCH, such as speech, or no data such as DTX. TPC bits 512 may be positioned next, which may be followed by transport format combination indicator (TFCI) bits 513. TFCI bits, however, are not utilized in conjunction with BTFD. Another group of data bits 514 from the DPDCH may come next, and finally, pilot bits 515 from the DPCCH may come last in the slot 510. Each slot 510 of the fifteen slots that compose a radio frame 510 may be arranged similarly. The detector may then exploit the known DPCH slot format.

Figure 5A:
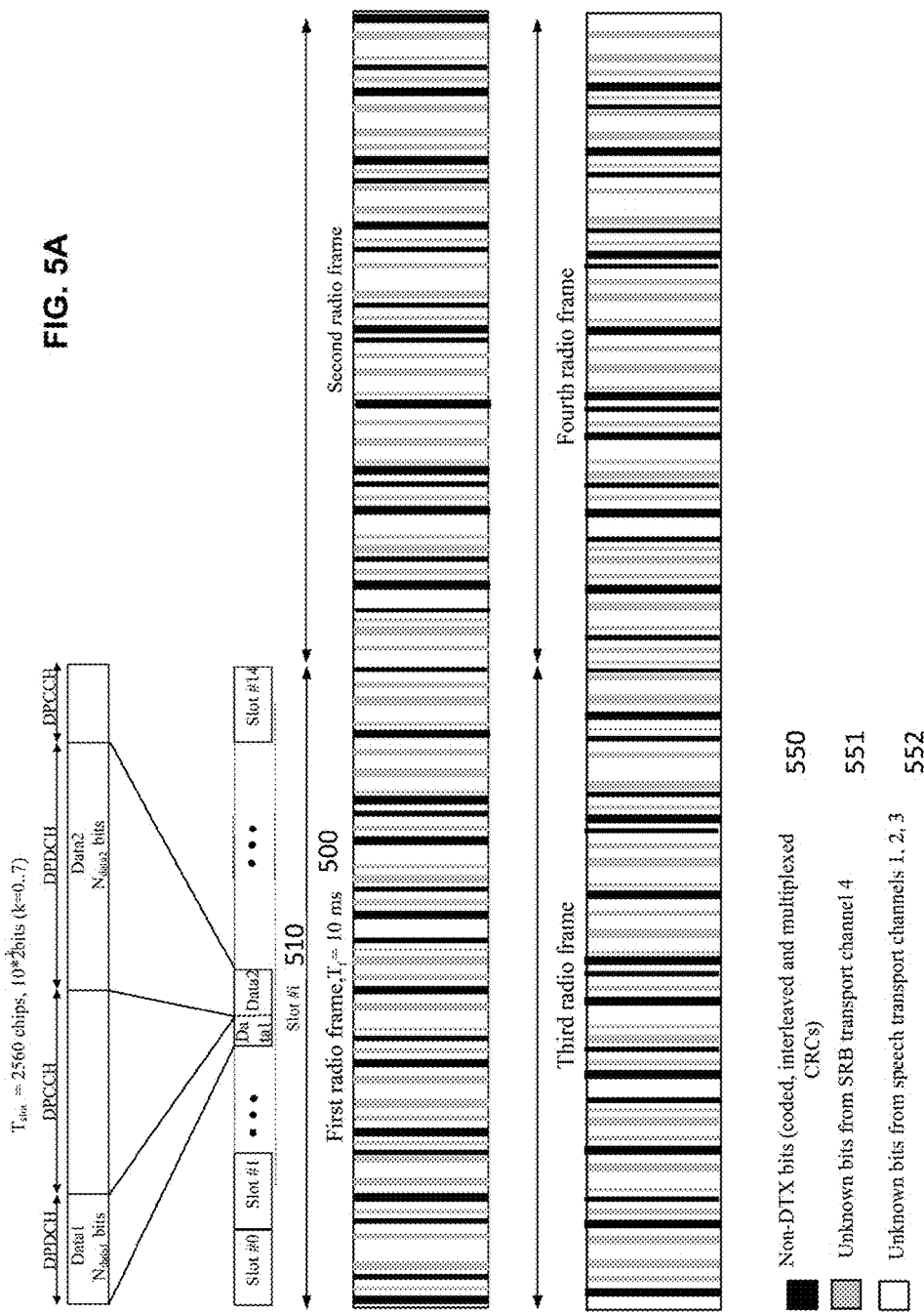
FIG. 5A is a diagram illustrating a resultant detection pattern.

FIG. 5A illustrates the resulting detection patterns in a radio frame 500. Three classes of bit positions are distinguished: (1) bits known to always carry information, i.e. the coded, multiplexed and interleaved CRCs 550, (2) bits which may be DTX or carry information for the SRB 551, (3) bits which may be DTX or carry information for the speech data 552.

Figure 6:
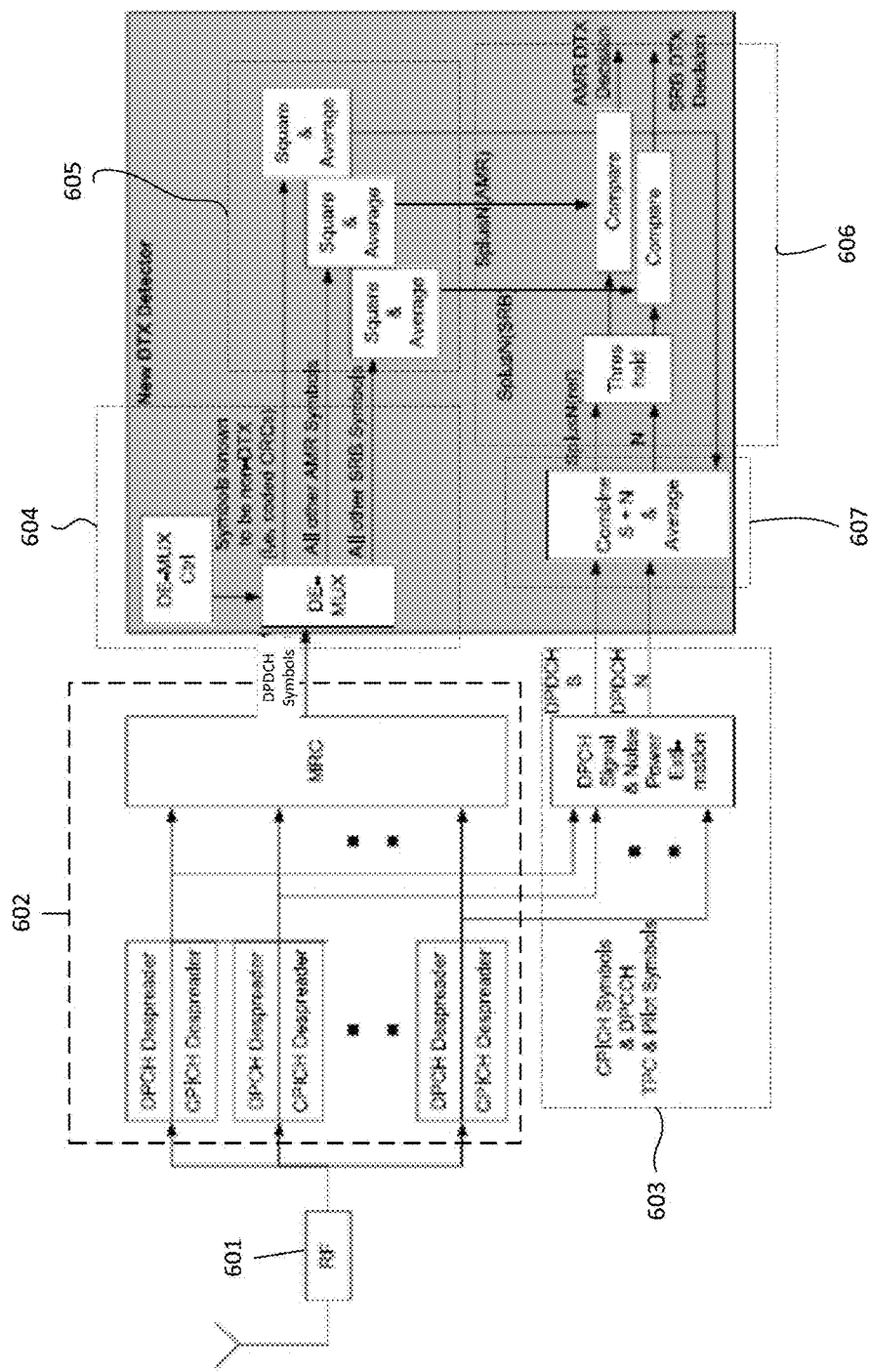
FIG. 6 is a block diagram illustrating components of a detector according to an aspect of the disclosure.

FIG. 6 is a block diagram illustrating components of a detector according to an aspect of the disclosure.

Voice data 120 may be received by the receiver 601, which may be a rake receiver. The voice data 120 may be rate matched, interleaved, and multiplexed, as described in FIG. 5, i.e., according to the 3GPP standard.

In step 602 the voice data may be demodulated, e.g., despread and combined using maximal-ratio combining. In step 603, signal power (S) and noise power (N) may be determined from the dedicated physical control channel bits (DPCCH), as well as from the common pilot channel (CPICH). Additionally, in step 607, the symbols in fixed positions corresponding to non-DTX bits from the dedicated physical data channel (DPDCH) may be squared and filtered to obtain a SignalPlusNoise power estimate. An improved estimate of SignalPlusNoise power, SplusN(ref) may then be obtained by averaging the SignalPlusNoise power estimate and the SignalPlusNoise power estimate obtained from the DPCCH.

The remaining DPDCH symbols from the first, second, and third transport channels, may then be de-multiplexed in step 604, and may then in step 605 be squared and filtered to obtain an estimate of the AMR speech data, SplusN (AMR). Similarly, in step 605, the remaining DPDCH symbols from the fourth transport channel, e.g., the SRB channel, may also be squared and filtered for an estimate SplusN(SRB) of the SRB data.

Finally, in step 606, the two estimates SplusN(AMR) and SplusN(SRB) may be compared to SplusN(ref), and a decision may be made using a suitable threshold. If DTX is detected, SplusN(AMR) and SplusN(SRB) may converge to the noise power estimate N. If the SplusN(AMR) or SplusN (SRB) converge to the SplusN(ref) estimate, then DTX may not be detected, e.g., speech or acoustic sounds may be received.

Figure 7:
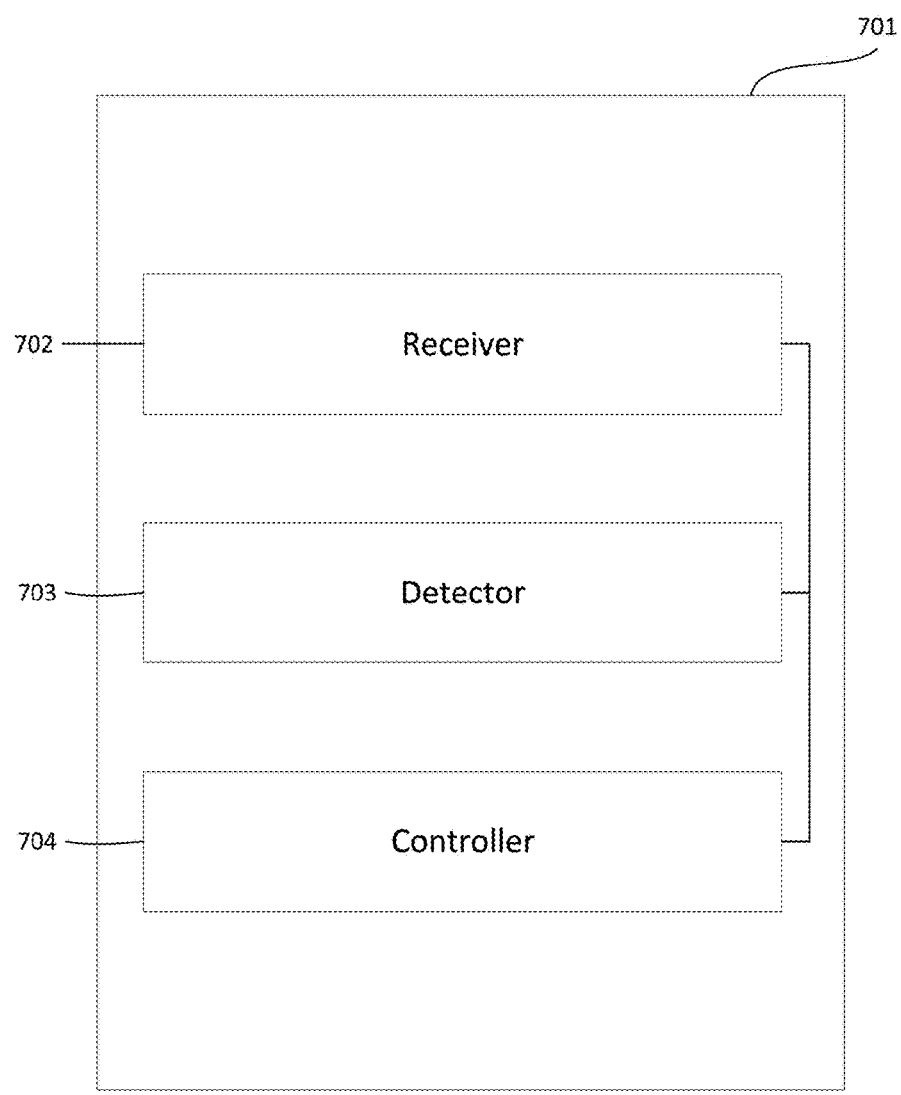
FIG. 7 is a block diagram according to an aspect of the disclosure.

FIG. 7 is a block diagram according to an aspect of the disclosure.

The mobile communications device 701, e.g., a UE, may include receiver 702, e.g., a rake receiver, which may be configured to receive a signal, e.g., a voice call, containing voice data which may be divided into a plurality of voice time intervals; a detector circuit 703, which may be configured to detect a silence indication, e.g., a speech pause, the absence of conversation or acoustic sounds, within the voice data, e.g., a telephonic call connection, speech, or acoustic sounds; and a controller circuit 704, which may be configured to deactivate the receiver based on the detected silence indication. The receiver 701 may be activated by a voice call connection.

The signal may further contain signaling data, e.g., SRB data, divided into a plurality of signaling time intervals. The detector circuit 703 may be further configured to detect an absence of signaling information, e.g., an empty SRB or an SRB TTI with non-DTX coded CRC, within the signaling data.

The controller circuit 704 may be further configured to deactivate the receiver 701 during at least one signaling time interval of the plurality of signaling time intervals based on a detected absence of signaling information.

Figure 8:
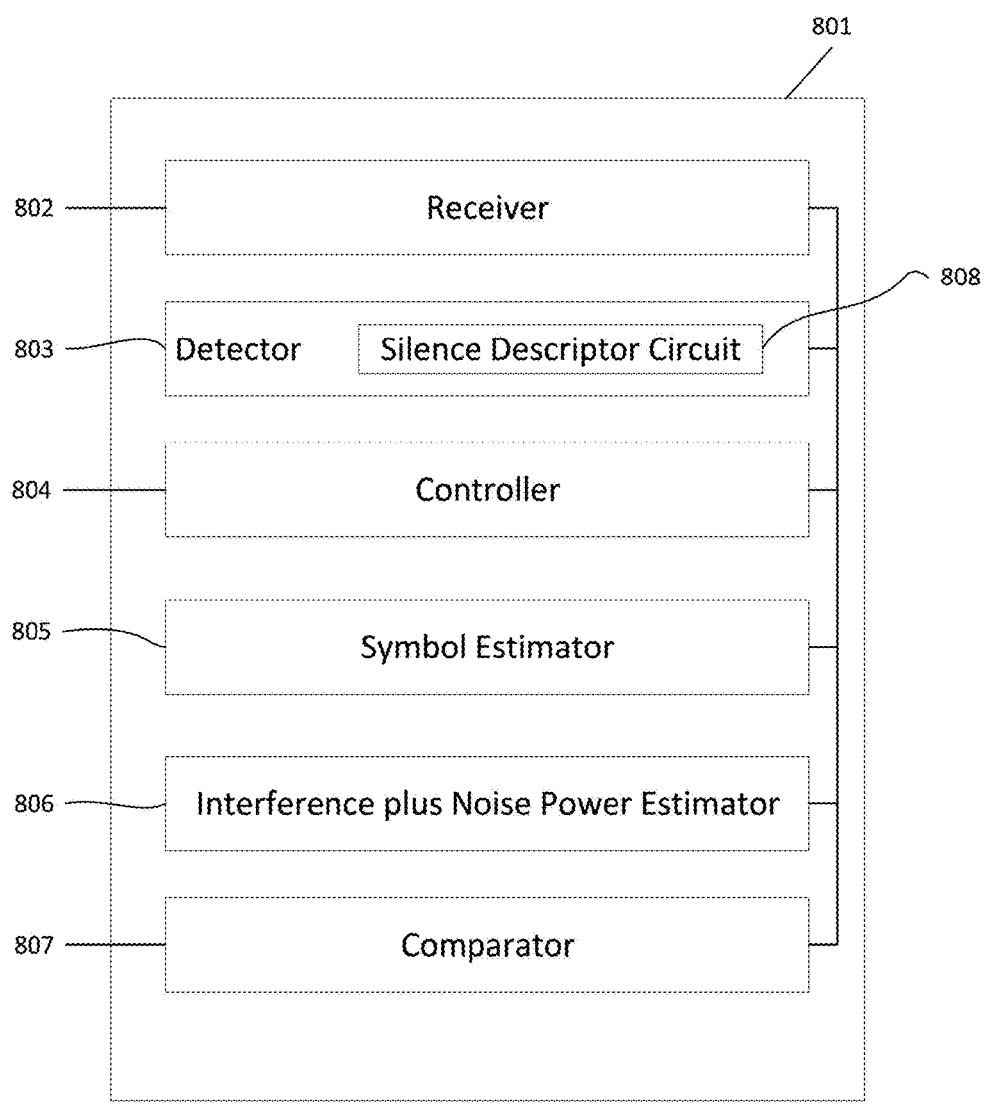
FIG. 8 is a block diagram according to an aspect of the disclosure.

FIG. 8 shows various components and circuits of a mobile communications device.

Mobile communications device 801 may contain other aspects of the disclosure. Receiver 802, detector 803, and controller 804, may correspond to receiver 702, detector 703, and controller 703. The voice data and signaling data may be composed of voice symbols, e.g., speech data, AMR coded speech data, configuration symbols, e.g., TPC, TFCI, or pilot data, and signaling symbols, e.g., SRB data. Receiver 802 may also contain a symbol estimator 805, which may be configured to determine a voice data indication, e.g., SplusN(AMR), from the voice symbols, and determine a signaling data indication, e.g., SplusN(SRB) from the signaling symbols. Additionally, receiver 802 may include an interference plus noise estimator 806 which may be configured to determine a noise power estimation, e.g., noise estimation N, and a comparator 807, which may be configured to compare the indication of symbols known to correspond to configuration or signaling symbols, e.g., SplusN(ref), the voice data indication, and the signaling data indication. The comparator 807 may then determine from the comparison if the voice data indication converges with the noise power estimation, which may correspond to a detected silence indication, e.g., DTX, within the voice data, and if the signaling data indication converges with the noise power estimation it may correspond to the detected absence of signaling information within the signaling data.

Furthermore, if the comparator 807 determines the voice data indication converges with the indication of symbols known to correspond to configuration or signaling symbols, e.g., SplusN(ref), it may correspond to a detected speech indication, e.g., AMR speech, the resumption of conversation, or a received acoustic sound, within the voice data. Additionally, if the signaling data indication converges with the indication of symbols known to correspond to configuration or signaling symbols, e.g., SplusN(ref), it may correspond to a detected presence of signaling information, e.g., received SRB data, within the signaling data.

The detector circuit 803 may further include a silence descriptor circuit 808, which may be configured to identify a voice time interval of the plurality of voice time intervals containing a silence descriptor, e.g., an SID First or an SID Update, which may be a first silence descriptor, in which case it may be an SID First, for example. The first silence descriptor may initiate the functions of the symbol estimator 805, the interference plus noise power estimator 806, and the comparator 807. The first silence indicator may further indicate an expected reception of at least one silent voice time interval, e.g., a speech pause or silence during a voice call. The first silence indicator may additionally indicate an expected reception of at least one silence descriptor update, e.g., an SID update, which may contain information related to comfort noise generation.

In various aspects of the disclosure any one or combination of the following: detector 803, the symbol estimator 805, the interference plus noise power estimator 806, and the comparator 807 may be deactivated during the at least one silence descriptor update. Deactivating all or a combination of these circuits may ensure comfort noise generation is not interfered with or determined to be DTX.

The signaling time interval may be a multiple of the voice time interval, e.g., the signaling time interval may be twice as long as the voice time interval or another multiple. The signaling time interval and the voice time interval may be synchronized, i.e., for the example where the signaling time interval may be twice as long as the voice time interval, a signaling time interval and a voice time interval may both start at the same time, and a subsequent voice time interval (as the signaling time interval may be twice as long as the voice time interval) may end at the same time as the signaling time interval, i.e., the periods of the signaling time interval and the voice time interval may be synchronized. By way of another example, where the signaling time interval and the voice time interval may have the same length of time, if they are synchronized, they may begin and end at the same time.

The voice time interval may be a transmission time interval for speech data, e.g., according to 3GPP standards. The voice time interval may be a transmission time interval for adaptive multi-rate speech data. The time period of the voice time interval may be 20 ms.

The signaling time interval may be a transmission time interval of signaling radio bearer data, e.g., data for handovers, reconfigurations, or releases. The signaling time interval may be 40 ms long.

The voice time interval may be composed of two radio frames, which may have an equal time period, e.g., a radio frame may be 10 ms. The signaling time interval may be composed of four radio frames, which may each have an equal time period, e.g., a radio frame may be 10 ms. One radio frame may be composed of fifteen slots.

A single slot may be composed of voice symbols, e.g., speech data or speech pause data which may include data related to comfort noise generation, as well as DTX, configuration symbols, e.g., TPC, TFCI, or Pilot data, and signaling symbols, e.g., SRB data.

The silence indication within the voice data may be an intentional absence of received voice data, e.g., a speech pause during a conversation. The silence indication may be received by the UE 801 as a discontinuous transmission of the transmission time interval for speech data, e.g., DTX. The absence of signaling information within the signaling data may be an intentional absence of received signaling data, e.g., there may not be any signaling data being transmitted to UE 801 or the UE 801 may not be receiving any signaling data, or the signaling data may only contain CRC in certain positions. The absence of signaling information within the signaling data may be an empty signaling radio bearer transmission time interval for signaling data or a transmission time interval containing only a coded and interleaved CRC for the signaling radio bearer, but no source data.

Figure 9:
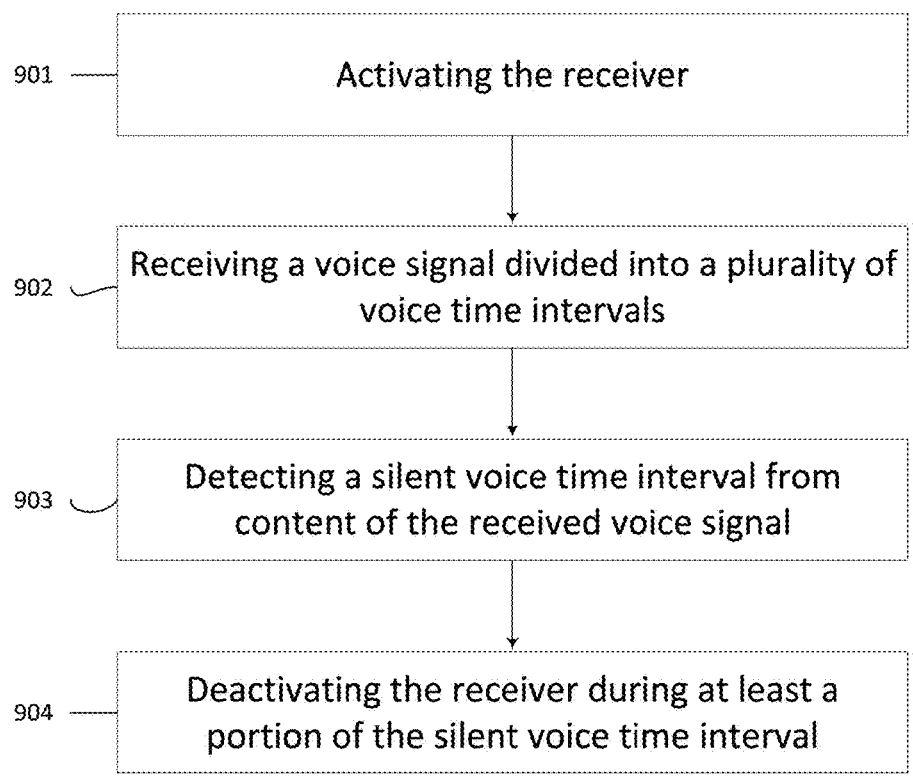
FIG. 9 shows a flow diagram illustrating a method of controlling a mobile communications device receiver.

FIG. 9 shows a flow diagram illustrating a method of controlling a mobile communications device receiver.

The method may include, in 901, activating the receiver 802; in 902, receiving a voice signal divided into a plurality of voice time intervals; in 903, detecting a silent voice time interval from content of the received voice signal; and, in 904, deactivating the receiver 802 during at least a portion of the silent voice time interval. The silent voice time interval may be a speech pause, an absence of received acoustic sounds, or a TTI containing DTX.

Furthermore, detecting the silent voice time interval in step 903 may occur during a first portion of the silent voice time interval, and deactivating the receiver may occur in at least a second portion of the silent voice time interval. The silent voice time interval may be an AMR speech TTI, which may be composed of fifteen slots. The first portion of the silent voice time interval may be a number of slots used to reliably detect, or verify by a number or percentage of detections of the presence of DTX in the TTI, e.g., one to ten slots or seven slots. The at least a portion of the silent voice time interval may be the remaining number of slots (fifteen slots may make up the silent voice time interval) after reliably detecting, or verifying, the presence of DTX in the TTI. Furthermore, the second portion of the silent voice time interval may be a period of time remaining in the silent voice time interval that may be exclusive of the first portion of the silent voice time interval.

A single voice time interval of the plurality of voice time intervals in step 902 may be an interval of speech data, e.g., the voice time interval may be a transmission time interval for adaptive multi-rate speech data. The voice time interval may be 20 ms. The silent voice time interval in step 903 may be a transmission time interval of discontinuous transmission for an adaptive multi-rate speech signal.

Deactivating the receiver in step 904 may involve turning off a receiver 802, e.g., a receiver baseband circuit and a radio frequency receiver circuit.

Step 902 may further include receiving a signaling signal divided into a plurality of signaling time intervals. Step 903 may further include detecting an empty signaling time interval, e.g., an SRB TTI containing DTX or an SRB TTI containing CRC in certain predetermined positions, from the plurality of signaling time intervals. Step 904 may further include deactivating the receiver 802 during at least a portion of the empty signaling time interval.

Detecting the empty signaling time interval from the plurality of signaling time intervals in step 903 may include detecting the empty signaling time interval during a first portion of the empty signaling time interval, e.g., in the first few slots of a TTI, from the plurality of signaling time intervals. Step 904 may include deactivating the receiver 802 during at least a second portion of the empty signaling time interval.

The second portion of the empty signaling time interval may be a period of time remaining in the empty signaling time interval exclusive of the first portion of the empty signaling time interval, e.g., deactivating the receiver for the remaining slots after detection of an empty signaling signal time interval.

A single signaling time interval of the plurality of signaling time intervals may be an interval of signaling data. The signaling time interval may be a transmission time interval for signaling radio bearer data, e.g., SRB data. The signaling time interval may be 40 ms. The empty signaling voice time interval may be a transmission time interval of discontinuous transmission for a signaling radio bearer signal, e.g., an SRB TTI containing DTX or CRC fixed in predetermined positions.

Step 903 may further include identifying a first silence descriptor transmission time interval, e.g., an SID First. Step 903 may additionally include initiating a signal content detector upon detection of the first silence descriptor.

Figure 10:
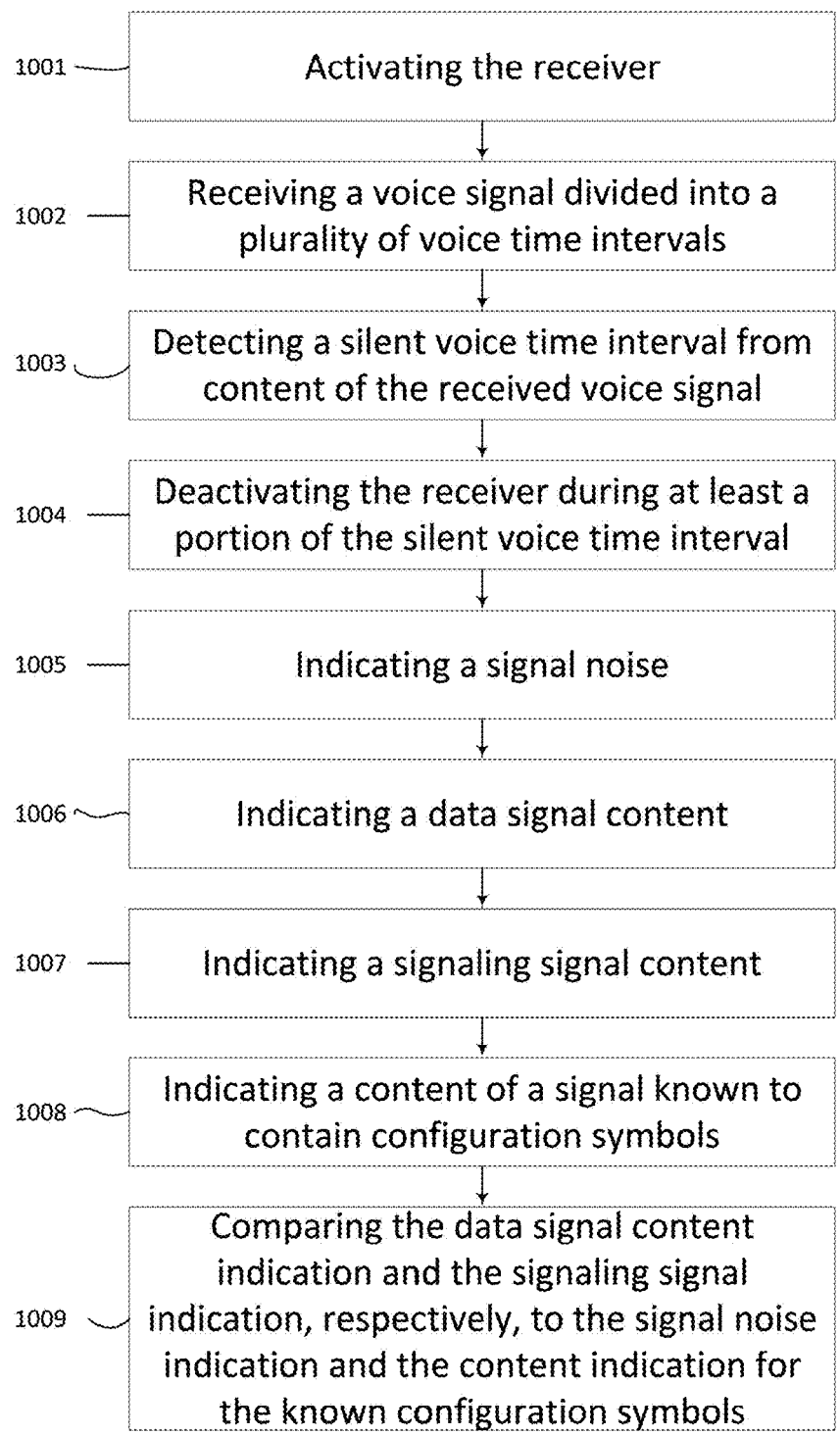
FIG. 10 shows a flow diagram illustrating a method of controlling a mobile communications device receiver.

FIG. 10 shows a flow diagram illustrating a method of controlling a mobile communications device receiver.

The method may include, in 1001, activating the receiver 802; in 1002, receiving a voice signal divided into a plurality of voice time intervals; in 1003, detecting a silent voice time interval from content of the received voice signal; in 1004, deactivating the receiver 802 during at least a portion of the silent voice time interval. The method may further include, in 1005, determining a signal noise indication, e.g., a noise power estimation or noise power estimation N; in 1006, determining a data signal content indication, e.g., SplusN (AMR); in 1007, determining a signal content indication, e.g., SplusN(SRB); in 1008, determining a content indication of a signal known to contain configuration symbols, e.g., SplusN(ref); and, in 1009, comparing the data signal content indication and the signaling signal indication, respectively, to the signal noise indication and the content indication for the known configuration symbols.

Determining the signal interference plus noise indication in step 1005 may be determined from data on a dedicated physical data channel. The content indication for the known configuration symbols in step 1008 may be determined from data on at least one of a common pilot channel, a dedicated physical control channel, and a dedicated physical data channel. For example, the content indication in step 1008 may be determined from common pilot channel symbols, transmit power control symbols on a dedicated physical control channel, pilot symbols on a dedicated physical control channel, and coded cyclic redundancy check symbols on a dedicated physical data channel.

Step 1009 may include comparing if the data signal content indication or the signaling signal content indication converges with the signal interference plus noise indication, whereby the receiver 802 may be deactivated for at least part of the second portion of the silent voice time interval. Step 1009 may further deactivate the signal content detector 805 if the data signal content indication converges with the content indication for the known configuration symbols in any of one, two, or more, consecutive voice time intervals, e.g., two TTIs of AMR speech data.

A silent voice time interval of step 1009 may be composed of thirty slots, e.g., two frames of fifteen slots, each, and the receiver 802 may be reactivated at least before the last slot in the silent voice time interval in order to reacquire the signal. The signal content detector in step 1009 may be inactive during a silence descriptor update transmission time interval so that comfort noise generation may not be interrupted.

Various aspects of the disclosure address devices and methods to improve battery consumption of a mobile communications device by deactivating the receiver of a UE while still receiving certain desired data. While these aspects may save battery power, it may lead to a situation where a network may detect that the mobile communications device may not be complying with 3GPP standards due to the battery consumption saving methods. This may have negative effects on normal operation of the mobile communications device on the network. The following aspects of the disclosure discuss components and structure to limit these negative effects.

Turning off the receiver 802 during speech pauses may leave uplink and downlink power control loops open. One aspect of the disclosure may transmit an up and down sequence for downlink power control in the uplink. Another aspect of the disclosure may activate the receiver at certain positions within a slot to receive uplink power control bits.

Figure 11:
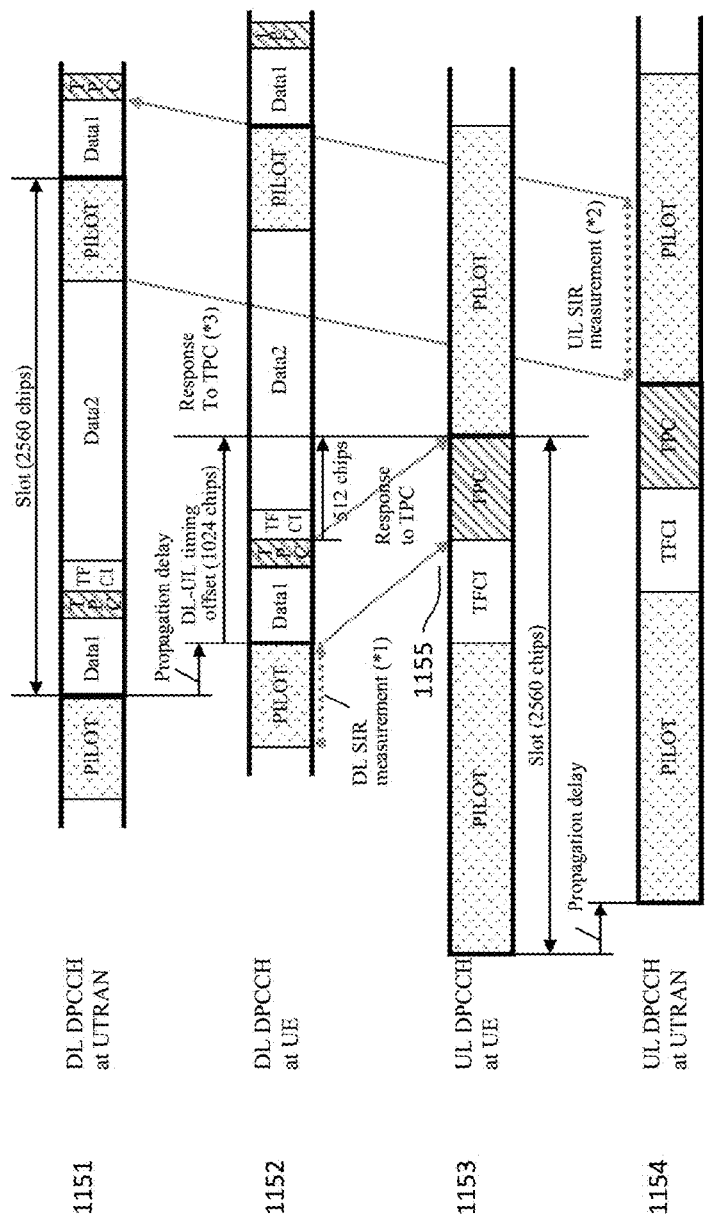
FIG. 11 is a timing chart showing uplink and downlink power control loops.

FIG. 11 is a timing chart showing uplink and downlink power control loops.

The DL SIR measurement may be made during reception of pilot data 1155. 1151 shows a signal sent from a base station in relation to uplink power control. 1152 shows the signal arriving at the UE for uplink power control. 1153 shows a signal sent from a UE for downlink power control. 1154 shows the signal arriving at the base station for downlink power control. 1155 shows a downlink signal interference ratio (SIR) measurement taking place during reception of the pilot data. If the receiver 802 is activated to receive the pilot and perform a DL SIR measurement during that reception in each slot, the mobile communication device 801 may be able to achieve 3GPP compliancy by completing the power control loop. Alternatively, more battery consumption savings may be achieved by leaving the receiver 802 off and transmitting an artificial, or simulated, sequence of power control instructions in an up and down sequence. This may convince the network the UE is complying with applicable standards.

Alternatively, the DL SIR measurement may be made during reception of TPC data. A signal sent from a base station in relation to uplink power control. The signal may arrive at the UE for uplink power control. Another signal may be sent from a UE for downlink power control. The signal may arrive at the base station for downlink power control. A signal interference ratio (SIR) measurement may take place during reception of the transmission power control (TPC). This position may be chip 256 to chip 511 (a slot may be composed of 2,560 chips). If the receiver is activated to receive the TPC and perform a DL SIR measurement during that reception in each slot, the mobile communication device may be able to achieve 3GPP compliancy by completing the power control loop. Alternatively, more battery consumption savings may be achieved by leaving the receiver 802 off and transmitting an artificial, or simulated, sequence of power control instructions in an up and down sequence. This may convince the network the UE is complying with applicable standards.

FIG. 12 shows various components and circuits according to an aspect of the disclosure.

The mobile communications device 1201 may be similar to that of FIG. 7 and FIG. 8. Mobile communication device 1201 may have a transmitter 908, e.g., a transmitter or a transceiver. Mobile communication device 1201 may have an artificial power control sequence circuit 1209, which may be configured to generate a simulated sequence of power control instructions. The simulated sequence of power control instructions may be transmitted by the transmitter 908 to a second mobile communications device 1211, e.g., a base station, NodeB, or eNodeB, via air interface 1212. The artificial power control sequence circuit 1209 may generate a simulated sequence of power control instructions, which may repeat an up and down sequence, while maintaining a predetermined power level for downlink.

Controller circuit 1204 may be further configured to activate the receiver 1202 to receive power control information, e.g., TPC. The TPC may be contained in 128 chips or 256 chips. In another aspect of the disclosure, controller circuit 904 may be configured to activate the receiver 1202 to receive pilot information, e.g., pilot data. The controller circuit 1204 may be further configured to activate the receiver 1202 to receive pilot information until the silence indication within the voice data and the absence of signaling information within the signaling data is detected, i.e., at the beginning of a TTI, the controller circuit 1204 may activate the receiver 1202 to receive the pilot information in each slot until DTX on the AMR and SRB channel may be detected or DTX on the AMR channel and CRC in specific positions on the SRB channel. The reception of the pilot information may be controlled by the controller circuit 1204 until the silence indication within the voice data and the absence of signaling information within the signaling data is first detected or reliably detected, e.g., after a few slots are confirmed as having the silence indication or the absence of signaling information.

Mobile communications device 1201 may further include a signal quality measurement circuit 1210, which may be configured to perform a measurement of signal quality during the reception of the pilot information. The measurement of the signal quality may be a signal to interference ratio measurement. In order to facilitate proper reception of the power control information or the pilot information, the receiver 1202 may be activated prior to reception of the power control information or pilot information in order to reacquire a mobile communications connection 1211. The activation to reacquire the signal may occur 256 chips prior to reception. The receiver 1202 may also be reactivated before the last slot of a TTI to reacquire a mobile communications connection 1211 before the beginning of the next voice transmission time interval and signaling transmission time interval.

In other aspects of the disclosure, it may be disadvantageous to utilize detector 1203. In such instances, detector 1203 may not be utilized. Such instances may be during a compressed mode phase, during utilization of multiple receiver antennas, when other receiver activities are necessary besides the voice data, e.g., neighbor cell measurements, if transmission power exceeds a predetermined threshold, if Ec/Io and received signal code power (RSCP) of the active set of cells do not exceed a predetermined threshold, and in cases where the UE is highly mobile, i.e., travelling at a high velocity.

The following examples pertain to further aspects of the disclosure

An example 1 discloses a mobile communications device, which may include: a receiver configured to receive a signal containing voice data divided into a plurality of voice time intervals, a detector circuit configured to detect a silence indication within the voice data, and a controller circuit configured to deactivate the receiver during at least one voice time interval of the plurality of voice time intervals based on the detected silence indication.

Example 2 may include the mobile communications device of example 1, wherein the signal further contains signaling data divided into a plurality of signaling time intervals.

Example 3 may include the mobile communications device of example 2, wherein the detector circuit is further configured to detect an absence of signaling symbols within the signaling data.

Example 4 may include the mobile communications device of example 3, wherein the controller circuit is configured to deactivate the receiver during at least one signaling time interval of the plurality of signaling time intervals based on the detected absence of signaling symbols.

Example 5 may include the mobile communications device of example 1, wherein the receiver is activated by a voice call connection.

Example 6 may include the mobile communications device of example 4, which may further include: wherein the voice data and the signaling data are composed of voice symbols, configuration symbols, and signaling symbols; a symbol estimator configured to: determine an indication of symbols known to correspond to configuration or signaling symbols, determine a voice data indication from the voice symbols, and determine a signaling data indication from the signaling symbols; an interference plus noise power estimator configured to determine a noise power estimation; and a comparator configured to compare the indication of symbols known to correspond to configuration or signaling symbols, the voice data indication, and the signaling data indication, wherein if the voice data indication converges with the noise power estimation, it corresponds to the detected silence indication within the voice data, and wherein if the signaling data indication converges with the noise power estimation it corresponds to the detected absence of signaling symbols within the signaling data.

Example 7 may include the mobile communications device of example 6, wherein if the voice data indication converges with the indication of symbols known to correspond to configuration or signaling symbols, it corresponds to a detected speech indication within the voice data; wherein if the signaling data indication converges with the indication of symbols known to correspond to configuration or signaling symbols it corresponds to a detected presence of signaling information within the signaling data.

Example 8 may include the mobile communications device of example 1, wherein the detector circuit may further include a silence descriptor identification circuit configured to identify a voice time interval of the plurality of voice time intervals containing a silence descriptor.

Example 9 may include the mobile communications device of example 8, wherein the silence descriptor is a first silence descriptor.

Example 10 may include the mobile communications device of examples 6 and 8, wherein the first silence descriptor initiates the symbol estimator, the interference plus noise power estimator, and the comparator.

Example 11 may include the mobile communications device of example 6, wherein the first silence descriptor indicates an expected reception of at least one silent voice time interval.

Example 12 may include the mobile communications device of example 6, wherein the first silence descriptor indicates an expected reception of at least one silence descriptor update.

Example 13 may include the mobile communications device of example 7, wherein the at least one silence descriptor update is composed of information related to comfort noise generation.

Example 14 may include the mobile communications device of examples 6, 12, and 13, wherein the symbol estimator, the interference plus noise power estimator, and the comparator, are deactivated during the at least one silence descriptor update.

Example 15 may include the mobile communications device of example 2, wherein the signaling time interval is a multiple of the voice time interval.

Example 16 may include the mobile communications device of example 1, wherein the signaling time interval is twice the voice time interval.

Example 17 may include the mobile communications device of example 2, wherein a period of the signaling time interval and a period of the voice time interval are synchronized.

Example 18 may include the mobile communications device of example 17, wherein the period of the signaling time interval and the period of the voice time interval are synchronized to begin at the same time.

Example 19 may include the mobile communications device of example 1, wherein the voice time interval is a transmission time interval for speech data.

Example 20 may include the mobile communication device of example 1, wherein the voice time interval is a transmission time interval for adaptive multi-rate speech data.

Example 21 may include the mobile communications device of examples 17 or 18, wherein the period of the voice time interval is 20 ms.

Example 22 may include the mobile communications device of example 2, wherein the signaling time interval is a transmission time interval of signaling data.

Example 23 may include the mobile communications device of example 2, wherein the signaling time interval is a transmission time interval of signaling radio bearer data.

Example 24 may include the mobile communications device of examples 22 or 23, wherein the signaling time interval is 40 ms.

Example 25 may include the mobile communications device of example 1, wherein the silence indication within the voice data is an intentional absence of received voice data.

Example 26 may include the mobile communications device of example 25, wherein the silence indication within the voice data is a discontinuous transmission of the transmission time interval for speech data.

Example 27 may include the mobile communications device of example 3, wherein the absence of signaling information within the signaling data is an intentional absence of received signaling data.

Example 28 may include the mobile communications device of example 3, wherein the absence of signaling information within the signaling data is an empty signaling radio bearer transmission time interval for signaling data.

Example 29 may include the mobile communications device of example 1, wherein the voice time interval is composed of two radio frames, wherein the radio frames have an equal time period.

Example 30 may include the mobile communications device of example 2, wherein the signaling time interval is composed of four radio frames, wherein the radio frames have an equal time period.

Example 31 may include the mobile communications device of examples 29 or 30, wherein one radio frame is composed of fifteen slots.

Example 32 may include the mobile communications device of example 31, wherein one slot is composed of voice symbols, configuration symbols, and signaling symbols.

Example 33 may include the mobile communications device of example 1, which may further include: a transmitter.

Example 34 may include the mobile communications device of example 33, which may further include: an artificial power control sequence circuit configured to generate a simulated sequence of power control instructions.

Example 35 may include the mobile communications device of example 34, wherein the simulated sequence of power control instructions are transmitted by the transmitter to a second mobile communications device.

Example 36 may include the mobile communications device of example 35, wherein the simulated sequence of power control instructions is a repeating up and down sequence maintaining a predetermined power level for downlink.

Example 37 may include the mobile communications device of example 1, wherein the controller circuit is further configured to activate the receiver to receive power control information.

Example 38 may include the mobile communications device of example 1, wherein the controller circuit is further configured to activate the receiver to receive pilot information.

Example 39 may include the mobile communications device of examples 6 and 38, wherein the controller circuit is further configured to activate the receiver to receive pilot information until the silence indication within the voice data and the absence of signaling information within the signaling data is detected.

Example 40 may include the mobile communications device of examples 37 or 38, which may further include: a signal quality measurement circuit configured to perform a measurement of signal quality during the reception of the power control information.

Example 41 may include the mobile communications device of examples 38 or 39, which may further include: a signal quality measurement circuit configured to perform a measurement of signal quality during the reception of the pilot information.

Example 42 may include the mobile communications device of examples 40 or 41, wherein the measurement of signal quality is a signal to interference ratio measurement.

Example 43 may include the mobile communications device of example 37, wherein the receiver is activated prior to reception of the power control information to reacquire a mobile communications connection.

Example 44 may include the mobile communications device of example 38, wherein the receiver is activated prior to reception of the pilot information to reacquire a mobile communications connection.

Example 45 may include the mobile communications device of examples 43 or 44, wherein the activation occurs 256 chips prior to reception of the power control information or pilot information.

Example 46 may include the mobile communications device of examples 18 and 31, wherein the receiver is reactivated two slots before the beginning of the next voice transmission time interval and signaling transmission time interval.

Example 47 may include the mobile communications device of examples 6, 7, and 31, wherein the detector is deactivated after three consecutive intervals of detected speech indication.

Example 48 may include the mobile communications device of example 37, wherein the power control information is contained in 128 chips.

Example 49 may include the mobile communications device of example 37, wherein the power control information is contained in 256 chips.

Example 50 may include the mobile communications device of example 38, wherein the pilot information is contained in 256 chips.

An example 51 discloses mobile communications device, which may include: a receiver configured to receive a signal containing voice data divided into a plurality of voice time intervals, a detector circuit configured to detect a speech indication within the voice data, and a controller circuit configured to deactivate the receiver during at least one voice time interval of the plurality of voice time intervals based on the detected speech indication.

Example 52 may include the mobile communications device of example 51, wherein the signal further contains signaling data divided into a plurality of signaling time intervals.

Example 53 may include the mobile communications device of example 52, wherein the detector circuit is further configured to detect an indication of signaling symbols within the signaling data.

Example 54 may include the mobile communications device of example 53, wherein the controller circuit is configured to deactivate the receiver during at least one signaling time interval of the plurality of signaling time intervals based on the detected indication of signaling symbols.

Example 55 may include the mobile communications device of example 51, wherein the receiver is activated by a voice call connection.

Example 56 may include the mobile communication device of example 54, which may further include: wherein the voice data and the signaling data are composed of voice symbols, configuration symbols, and signaling symbols; a symbol estimator configured to: determine an indication of symbols known to correspond to configuration or signaling symbols, determine a voice data indication from the voice symbols, and determine a signaling data indication from the signaling symbols; a noise power estimator configured to determine a noise power estimation; and a comparator configured to compare the indication of symbols known to correspond to configuration or signaling symbols, the voice data indication, and the signaling data indication, wherein if the voice data indication converges with the noise power estimation, it corresponds to the detected speech indication within the voice data, and wherein if the signaling data indication converges with the noise power estimation it corresponds to the indication of signaling within the signaling data.

Example 57 may include the mobile communications device of example 56, wherein if the voice data indication converges with the indication of symbols known to correspond to configuration or signaling symbols, it corresponds to a detected second speech state indication within the voice data, and wherein if the signaling data indication converges with the indication of symbols known to correspond to configuration or signaling symbols it corresponds to a detected second type of indication of signaling information within the signaling data.

Example 58 may include the mobile communications device of example 51, wherein the detector circuit may further include a silence descriptor identification circuit configured to identify a voice time interval of the plurality of voice time intervals containing a silence descriptor.

Example 59 may include the mobile communications device of example 58, wherein the silence descriptor is a first silence descriptor.

Example 60 may include the mobile communications device of examples 56 and 58, wherein the first silence descriptor initiates the symbol estimator, the noise power estimator, and the comparator.

Example 61 may include the mobile communications device of example 56, wherein the first silence descriptor indicates an expected reception of at least one silent voice time interval.

Example 62 may include the mobile communications device of example 56, wherein the first silence descriptor indicates an expected reception of at least one silence descriptor update.

Example 63 may include the mobile communications device of example 57, wherein the at least one silence descriptor update is composed of information related to comfort noise generation.

Example 64 may include the mobile communications device of examples 56, 62, and 63, wherein the symbol estimator, the noise power estimator, and the comparator, are deactivated during the at least one silence descriptor update.

Example 65 may include the mobile communications device of example 52, wherein the signaling time interval is a multiple of the voice time interval.

Example 66 may include the mobile communications device of example 51, wherein the signaling time interval is twice the voice time interval.

Example 67 may include the mobile communications device of example 52, wherein a period of the signaling time interval and a period of the voice time interval are synchronized.

Example 68 may include the mobile communications device of example 67, wherein the period of the signaling time interval and the period of the voice time interval are synchronized to begin at the same time.

Example 69 may include the mobile communications device of example 51, wherein the voice time interval is a transmission time interval for speech data.

Example 70 may include the mobile communications device of example 51, wherein the voice time interval is a transmission time interval for adaptive multi-rate speech data.

Example 71 may include the mobile communications device of examples 67 or 68, wherein the period of the voice time interval is 20 ms.

Example 72 may include the mobile communications device of example 2, wherein the signaling time interval is a transmission time interval of signaling data.

Example 73 may include the mobile communications device of example 52, wherein the signaling time interval is a transmission time interval of signaling radio bearer data.

Example 74 may include the mobile communications device of examples 72 or 73, wherein the signaling time interval is 40 ms.

Example 75 may include the mobile communications device of example 51, wherein the speech indication within the voice data is an intentional absence of received voice data.

Example 76 may include the mobile communications device of example 75, wherein the speech indication within the voice data is a discontinuous transmission of the transmission time interval for speech data.

Example 77 may include the mobile communications device of example 53, wherein the absence of signaling information within the signaling data is an intentional absence of received signaling data.

Example 78 may include the mobile communications device of example 53, wherein the indication of signaling information within the signaling data is an empty signaling radio bearer transmission time interval for signaling data.

Example 79 may include the mobile communications device of example 51, wherein the voice time interval is composed of two radio frames, wherein the radio frames have an equal time period.

Example 80 may include the mobile communications device of examples 52, wherein the signaling time interval is composed of four radio frames, wherein the radio frames have an equal time period.

Example 81 may include the mobile communications device of examples 79 or 80, wherein one radio frame is composed of fifteen slots.

Example 82 may include the mobile communications device of example 81, wherein one slot is composed of voice information symbols, configuration information symbols, and signaling information symbols.

Example 83 may include the mobile communications device of example 51, which may further include: a transmitter.

Example 84 may include the mobile communications device of example 83, which may further include: an artificial power control sequence circuit configured to generate a simulated sequence of power control instructions.

Example 85 may include the mobile communications device of example 84, wherein the simulated sequence of power control instructions are transmitted by the transmitter to a second mobile communications device.

Example 86 may include the mobile communications device of example 85, wherein the simulated sequence of power control instructions is a repeating up and down sequence maintaining a predetermined power level for downlink.

Example 87 may include the mobile communications device of example 51, wherein the controller circuit is further configured to activate the receiver to receive power control information.

Example 88 may include the mobile communications device of example 51, wherein the controller circuit is further configured to activate the receiver to receive pilot information.

Example 89 may include the mobile communications device of examples 56 and 88, wherein the controller circuit is further configured to activate the receiver to receive pilot information until the silence indication within the voice data and the absence of signaling information within the signaling data is detected.

Example 90 may include the mobile communications device of examples 87 or 88, which may further include: a signal quality measurement circuit configured to perform a measurement of signal quality during the reception of the power control information.

Example 91 may include the mobile communications device of examples 88 or 89, which may further include: a signal quality measurement circuit configured to perform a measurement of signal quality during the reception of the pilot information.

Example 92 may include the mobile communications device of examples 90 or 91, wherein the measurement of signal quality is a signal to interference ratio measurement.

Example 93 may include the mobile communications device of example 87, wherein the receiver is activated prior to reception of the power control information to reacquire a mobile communications connection.

Example 94 may include the mobile communications device of example 88, wherein the receiver is activated prior to reception of the pilot information to reacquire a mobile communications connection.

Example 95 may include the mobile communications device of examples 93 or 94, wherein the activation occurs 256 chips prior to reception of the power control information or pilot information.

Example 96 may include the mobile communications device of examples 68 and 81, wherein the receiver is reactivated two slots before the beginning of the next voice transmission time interval and signaling transmission time interval.

Example 97 may include the mobile communications device of examples 56, 57, and 81, wherein the detector is deactivated after three consecutive intervals of the detected second speech state indication.

Example 98 may include the mobile communications device of example 87, wherein the power control information is contained in 128 chips.

Example 99 may include the mobile communications device of example 87, wherein the power control information is contained in 256 chips.

Example 100 may include the mobile communications device of example 88, wherein the pilot information is contained in 128 chips or 256 chips.

An example 101 discloses a method for controlling a mobile communications device receiver which may include: activating the receiver, receiving a voice signal divided into a plurality of voice time intervals, detecting a silent voice time interval from content of the received voice signal, and deactivating the receiver during at least a portion of the silent voice time interval.

Example 102 may include the method of example 101, wherein detecting the silent voice time interval occurs during a first portion of the silent voice time interval and wherein deactivating the receiver occurs during at least part of a second portion of the silent voice time interval.

Example 103 may include the method of example 102, wherein the second portion of the silent voice time interval is a period of time remaining in the silent voice time interval exclusive of the first portion of the silent voice time interval.

Example 104 may include the method of example 101, wherein one of the plurality of voice time intervals is an interval of speech data.

Example 105 may include the method of example 101, wherein the voice time interval is a transmission time interval for adaptive multi-rate speech data.

Example 106 may include the method of example 101, wherein the voice time interval is 20 ms.

Example 107 may include the method of example 101, wherein a silent voice time interval is a transmission time interval of discontinuous transmission for an adaptive multi-rate speech signal.

Example 108 may include the method of either examples 101 or 102, wherein deactivating the receiver is turning off a receiver baseband circuit and a radio frequency receiver circuit.

Example 109 may include the method of example 101, which may further include: receiving a signaling signal divided into a plurality of signaling time intervals, detecting an empty signaling time interval from the plurality of signaling time intervals, and deactivating the receiver during at least a portion of the empty signaling time interval.

Example 110 may include the method of example 109, wherein the empty signaling time interval is detected during a first portion of the empty signaling time interval and wherein the receiver is deactivated during at least part of a second portion of the empty signaling time interval.

Example 111 may include the method of example 110, wherein the second portion of the empty signaling time interval is a period of time remaining in the empty signaling time interval exclusive of the first portion of the empty signaling time interval.

Example 112 may include the method of example 109, wherein one of the plurality of signaling time intervals is an interval of signaling data.

Example 113 may include the method of example 109, wherein the signaling time interval is a transmission time interval for signaling radio bearer data.

Example 114 may include the method of example 109, wherein the signaling time interval is 40 ms.

Example 115 may include the method of any of examples 109, wherein the empty signaling voice time interval is a transmission time interval of discontinuous transmission for a signaling radio bearer signal.

Example 116 may include the method of either example 102 or 109, which may further include: identifying a first silence descriptor transmission time interval.

Example 117 may include the method of example 116, which may further include: initiating a signal content detector upon detection of the first silence descriptor.

Example 118 may include the method of example 117, wherein the signal content detector: determines a signal interference plus noise indication; determines a data signal content indication; determines a signaling signal content indication; determines a content indication of a signal known to contain configuration symbols; and compares the data signal content indication and the signaling signal indication, respectively, to the signal interference noise indication and the content indication for the known configuration symbols.

Example 119 may include the method of example 118, wherein the signal noise indication is determined from data on a dedicated physical data channel.

Example 120 may include the method of example 118, wherein the content indication for the known configuration symbols is determined from data on at least one of a common pilot channel, a dedicated physical control channel, and a dedicated physical data channel.

Example 121 may include the method of example 118, wherein the content indication for the known configuration symbols is determined from common pilot channel symbols, transmit power control symbols on a dedicated physical control channel, pilot symbols on a dedicated physical control channel, and coded cyclic redundancy check symbols on a dedicated physical data channel.

Example 122 may include the method of example 118, wherein if the data signal content indication or the signaling signal content indication converges with the signal interference plus noise indication, the receiver is deactivated for at least part of the second portion of the silent voice time interval.

Example 123 may include the method of example 118, wherein if the data signal content indication converges with the content indication for the known configuration symbols in three consecutive voice time intervals, the signal content detector is deactivated.

Example 124 may include the method of example 12, wherein the silent voice time interval is composed of thirty slots, and wherein the receiver is reactivated at least before the last slot in the silent voice time interval.

Example 125 may include the method of example 117, wherein the signal content detector is inactive during a silence descriptor update time interval.

Example 126 may include the method of example 101, which may further include: transmitting a sequence of power control instructions.

Example 127 may include the method of example 126, wherein the sequence of power control instructions is an up and down sequence maintaining a predetermined power level for downlink and is constant for uplink.

Example 128 may include the method of example 102, which may further include: receiving transmissions of power control information during the first portion of the silent voice time interval.

Example 129 may include the method of example 128, which may further include: transmitting a sequence of power control instructions during the second portion of the silent voice time interval.

Example 130 may include the method of example 129, wherein the sequence of power control instructions is an up and down sequence maintaining a predetermined power level for downlink and is constant for uplink.

Example 131 may include the method of example 128, wherein a measurement of signal quality is performed during reception of the power control information.

Example 132 may include the method of example 131, wherein the measurement of signal quality is a signal to interference ratio measurement.

Example 133 may include the method of example 102, which may further include: receiving transmissions of pilot information during the first portion of the silent voice time interval.

Example 134 may include the method of example 133, wherein a measurement of signal quality is performed during reception of the pilot information.

Example 135 may include the method of example 134, wherein the measurement of signal quality is a signal to interference ratio measurement.

Example 136 may include the method of example 133, which may further include: transmitting a sequence of power control instructions during the second portion of the silent voice time interval.

Example 137 may include the method of example 136, wherein the sequence of power control instructions is an up and down sequence maintaining a predetermined power level for downlink and is constant for uplink.

Example 138 may include the method of example 101, which may further include: intermittently activating the receiver to receive power control information throughout the silent voice time interval.

Example 139 may include the method of example 138, wherein the receiver is activated for a duration of 256 chips to receive the power control information.

Example 140 may include the method of example 138, wherein the receiver is activated for a duration of 128 chips to receive the power control information.

Example 141 may include the method of example 138, wherein the receiver is activated prior to reception of the power control information to reacquire a mobile communications connection.

Example 142 may include the method of example 141, wherein the receiver is activated 256 chips before reception of the power control information.

Example 143 may include the method of example 138, wherein a measurement of signal quality is performed during the reception of the power control information.

Example 144 may include the method of example 143, wherein the measurement of signal quality is a signal to interference ratio measurement.

Example 145 may include the method of example 138, which may further include: intermittently activating the receiver to receive pilot information throughout the silent voice time interval.

Example 146 may include the method of example 145, wherein the receiver is activated for the duration of 256 chips.

Example 147 may include the method of example 145, wherein the receiver is activated prior to reception of the power control information to reacquire a mobile communications connection.

Example 148 may include the method of example 145, wherein the receiver is activated 256 chips before reception of the power control information.

Example 149 may include the method of example 145, wherein a measurement of signal quality is performed during the reception of the pilot information.

Example 150 may include the method of example 149, wherein the measurement of signal quality is a signal to interference ratio measurement.

Example 151 may include the mobile communications device of example 1, further including: a transmitter, an artificial power control sequence circuit configured to generate a simulated sequence of power control instructions, and wherein the simulated sequence of power control instructions are transmitted by the transmitter to a second mobile communications device.

Example 152 may include the mobile communications device of example 51, wherein the signal further contains signaling data divided into a plurality of signaling time intervals; wherein the detector circuit is further configured to detect an indication of signaling symbols within the signaling data; and wherein the controller circuit is configured to deactivate the receiver during at least one signaling time interval of the plurality of signaling time intervals based on the detected indication of signaling symbols.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communications device comprising:
   a receiver configured to receive a signal comprising voice data composed of a plurality of voice time intervals, wherein the received signal further comprises signaling data composed of a plurality of signaling time intervals;
   a detector circuit configured to detect silence within the voice data, wherein the detector circuit is further configured to detect an absence of at least one signaling symbol within the signaling data;
   a controller circuit configured to deactivate the receiver during at least one voice time interval of the plurality of voice time intervals based on the detected silence, wherein the controller circuit is configured to deactivate the receiver during at least one signaling time interval of the plurality of signaling time intervals based on the detected absence of signaling symbols;
   a symbol estimator configured to indicate at least one symbol known to correspond to the plurality of configuration symbols or the plurality of signaling symbols, indicate a voice data from the plurality of voice symbols, and indicate a signaling data from the plurality of signaling symbols;
   an interference plus noise power estimator configured to determine a noise power estimation: and
   a comparator configured to compare at least one symbol known to correspond to the plurality of configuration symbols or the plurality of signaling symbols, the voice data indication, and the signaling data indication, wherein when the voice data indication converges with the noise power estimation, the voice data indication converging with the noise power estimation corresponds to the detected silence within the voice data, and wherein when the signaling data indication converges with the noise power estimation, the signaling data indication converging with the noise power estimation corresponds to the detected absence of signaling symbols within the signaling data.

2. The mobile communications device of claim 1 wherein a period of the signaling time interval and a period of the voice time interval are synchronized.

3. The mobile communications device of claim 1, wherein the voice time interval is a transmission time interval for speech data.

4. The mobile communications device of claim 1, wherein the signaling time interval is a transmission time interval of signaling data.

5. The mobile communications device of claim 1, wherein the silence within the voice data is a discontinuous transmission of the transmission time interval for speech data.

6. The mobile communications device of claim 1, wherein the absence of signaling information within the signaling data is an empty signaling radio bearer transmission time interval for signaling data.

7. The mobile communications device of claim 1, further comprising:
a transmitter.

8. The mobile communications device of claim 1, further comprising: an artificial power control sequence circuit configured to generate a simulated sequence of power control instructions, and wherein the simulated sequence of power control instructions are transmitted by the transmitter to a second mobile communications device.

9. The mobile communications device of claim 8, wherein the simulated sequence of power control instructions is a repeating up and down sequence maintaining a predetermined power level for downlink.

10. The mobile communications device of claim 1, wherein the controller circuit is further configured to activate the receiver to receive power control information.

11. The mobile communications device of claim 10, further comprising: a signal quality measurement circuit configured to perform a measurement of signal quality during the reception of the power control information.

12. The mobile communications device of claim 1, wherein the controller circuit is further configured to activate the receiver to receive pilot information.

13. The mobile communications device of claim 12, further comprising: a signal quality measurement circuit configured to perform a measurement of signal quality during the reception of the pilot information.

14. A method for controlling a mobile communications device receiver comprising:
activating the receiver;
receiving a voice signal composed of a plurality of voice time intervals and a signaling signal composed of a plurality of signaling time intervals;
detecting a silent voice time interval from content of the received voice signal and an empty signaling time interval from the plurality of signaling time intervals;
deactivating the receiver during at least a portion of the silent voice time interval and a portion of the empty signaling time interval;
indicating at least one symbol known to correspond to the plurality of configuration symbols or the plurality of signaling symbols, a voice data from the plurality of voice symbols, and a signaling data from the plurality of signaling symbols;
determining a noise power estimation; and
comparing at least one symbol known to correspond to the plurality of configuration symbols or the plurality of signaling symbols, the voice data indication, and the signaling data indication,
wherein when the voice data indication converges with the noise power estimation, the voice data indication converging with the noise power estimation corresponds to the detected silence within the voice data, and wherein when the signaling data indication converges with the noise power estimation, the signaling data indication converging with the noise power estimation corresponds to the detected absence of signaling symbols within the signaling data.

15. The method of claim 14, further comprising generating a simulated sequence of power control instructions.

16. The method of claim 15, wherein the simulated sequence of power control instructions are transmitted by the mobile communications device to a second mobile communications device.

17. The method of claim 14, further comprising
activating the mobile communications device receiver to receive power control information.

18. The method of claim 17, further comprising
performing a measurement of signal quality during the reception of the power control information.

19. The method of claim 14, further comprising
activating the mobile communications device receiver to receive pilot information.

20. The method of claim 19, further comprising
performing a measurement of signal quality during the reception of the pilot information.

* * * * *